(12) United States Patent
Yoshinaga et al.

(10) Patent No.: US 6,738,059 B1
(45) Date of Patent: May 18, 2004

(54) APPARATUS AND METHODS FOR IMAGE PROCESSING USING MIXED DISPLAY OBJECTS

(75) Inventors: Takumi Yoshinaga, Tokyo (JP); Misaqa Kitamura, Tokyo (JP); Takashi Yuda, Tokyo (JP); Hitoshi Nakanishi, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/467,079

(22) Filed: Dec. 20, 1999

(30) Foreign Application Priority Data

Dec. 18, 1998 (JP) .......................................... 10-361336
Sep. 8, 1999 (JP) .......................................... 11-253933

(51) Int. Cl.$^7$ .............................................. G06T 15/00
(52) U.S. Cl. ................................................... 345/419
(58) Field of Search ................................ 345/419–424, 345/426–428, 441, 505, 506, 522, 582, 589, 619, 620; 386/46; 369/53.34

(56) References Cited

U.S. PATENT DOCUMENTS

| | | | | |
|---|---|---|---|---|
| 5,255,360 A | * | 10/1993 | Peaslee et al. ............... | 345/552 |
| 5,945,997 A | * | 8/1999 | Zhao et al. .................. | 345/581 |
| 6,002,407 A | * | 12/1999 | Fadden ........................ | 345/582 |
| 6,016,151 A | * | 1/2000 | Lin ............................. | 345/582 |
| 6,069,635 A | * | 5/2000 | Suzuoki et al. .............. | 345/582 |
| 6,088,313 A | * | 7/2000 | Tanaka ....................... | 369/53.34 |
| 6,137,954 A | * | 10/2000 | Sawabe et al. ................ | 386/46 |
| 6,139,434 A | * | 10/2000 | Miyamoto et al. ........... | 345/419 |
| 6,166,744 A | * | 12/2000 | Jaszlics et al. ............... | 345/421 |
| 6,227,973 B1 | * | 5/2001 | Kikuchi ....................... | 345/420 |
| 6,256,040 B1 | * | 7/2001 | Tanaka et al. ............... | 345/421 |
| 6,266,064 B1 | * | 7/2001 | Snyder ........................ | 345/421 |
| 6,333,747 B1 | * | 12/2001 | Murata et al. ............... | 345/582 |
| 6,348,917 B1 | * | 2/2002 | Vaswani ...................... | 345/418 |
| 6,379,249 B1 | * | 4/2002 | Satsukawa et al. ........... | 463/31 |
| 6,437,782 B1 | * | 8/2002 | Pieragostini et al. ........ | 345/426 |

FOREIGN PATENT DOCUMENTS

JP 409305791 A * 11/1997 ........... G06T/15/40

* cited by examiner

*Primary Examiner*—Mark Zimmerman
*Assistant Examiner*—Enrique L Santiago
(74) *Attorney, Agent, or Firm*—Finnegan, Henderson, Farabow, Garret & Dunner, L.L.P.

(57) ABSTRACT

An object of this invention is to provide an image processing apparatus and image processing method capable of reducing a load for drawing, diversifying image representation and smoothing character motion.

An image processing means (2) synthesizes background image data (3d) composed of movie image with character data (4d) composed of solid image of polygon data and supplies to a display (6). An image (60) produced by synthesizing the background image (3) with the character (4) is displayed on the display (6). A simple model (5d) composed of three dimensional data for determining the precedence in erasing a negative face between the background image data (3d) and character data (4d) is set in part of the background image data. The image processing means (2) determines a portion in which the character (4) is hidden by the background (3) based on the simple model and erase a corresponding portion. This erase processing enables a screen to be represented three-dimensionally. Meanwhile, it is possible to generate an image in which a motion of an object coincides with reproduced music with less computation amount without depending on complicated control.

15 Claims, 20 Drawing Sheets

APPARATUS AND METHODS FOR IMAGE
PROCESSING USING MIXED DISPLAY
OBJECTS

BACKGROUND OF THE INVENTION

1. Field of the Invention

The present invention relates to an image processing apparatus, an image processing method and a recording medium preferable for a game apparatus or the like usable in amusement centers and houses.

2. Description of the Related Art

With recent advancement of computer technology, video game apparatus using computer graphic technology has been widely used. This video game apparatus is widely accepted by users so that diversified kinds of the game apparatuses have been developed and diversified kinds of software have been supplied to the market.

The game apparatus having such an image processing function, generally, comprises a game control unit containing a control unit, an sound generating means such as a speaker and a display for supplying video images. In the game apparatus, a background scene displayed on a display is changed with a progress of a game and a character can be moved within that background scene in response to an instruction of a player. Seeing changes of the background scene displayed on the display with progress of the game, the player operates a control unit such as a joy pad to move the character within the background scene, enjoying that game.

There are various methods for creating the game screen for such a game apparatus. As one of the methods, if all the screen displayed on the display is created with polygon data, three-dimensional or perspective representation is enabled. Because image data of the game space is composed of three-dimensional data at this time, by changing an angle of a virtual camera (viewpoint of the camera) in the game space, images seen from all angles can be obtained, so that freedom of representation on the screen is increased tremendously.

Additionally, as a creation method for the game screen, a method using movie screen based on computer graphics has been well known. The movie screen based on the computer graphic mentioned here refers to a sequence of two-dimensional picture image data determined to move from some position to other position so that an angle for seeing the screen is determined. If this movie screen is used, a fine and beautiful screen can be ensured and further a load on the game apparatus for image processing is less than the other methods.

Under such an environment, a new game apparatus loaded with further another image processing function has appeared in actual entertainment business. This is a music game apparatus in which an object (character) displayed on the screen can be made to dance with a music. In the game apparatus, it is strongly desired that music tempo coincides with object motion. To move the character synchronously with music, a conventional computer system controls reproduction of music and an object motion on the basis of actual time.

In such a conventional game apparatus, in case where all images including the background and character are represented with polygon data, unless a large amount of polygon data are prepared, the screen is represented roughly and further, a joint portion between the polygon data and the other polygon data is represented, so that its entire representation becomes angular. If the background and character are composed of a large amount of polygon data, it takes a tremendous load on image processing although the screen is displayed finely, so that some extent of diversified representation can be achieved.

Further, in case of the movie screen creation method using the movie screen based on the computer graphics, because a displayed screen is two-dimensional data, its entire representation is flat, and therefore the three-dimensional representation is impossible. Further, because a camera angle is fixed in the aforementioned movie screen, the freedom of screen representation is very low.

On the other hand, in case of image processing for the aforementioned music game, a computation amount is large and control for the computation is complicated because reproduction of the music and motion of the object are controlled on the basis of the actual time.

SUMMARY OF THE INVENTION

Accordingly, an object invention is to solve the problems which the conventional game apparatuses have and then provide an image processing apparatus having such an image processing function, an image processing method thereby and a recording medium therefor.

More specifically, a first object of the present invention is to achieve an image processing capable of diversifying representation of a game screen, representing a motion of a display object moving on the game screen more smoothly, and reducing a drawing load remarkably.

Further, a second object of the present invention is to achieve an image processing capable of representing an image in which the motion of the object coincides (is linked) with reproduction of music easily and flexibly with less computation amount without depending on complicated control.

To achieve the above described first object, according to an aspect of the image processing apparatus of the present invention, there is provided an image processing apparatus wherein a first display object including a movie image and a second display object composed of solid image of polygon data are displayed on a display means, the image processing apparatus having an image processing means for carrying out image processing by setting up a simple model composed of three dimensional data for determining the precedence in erasing a negative face between the first display object and the second display object.

Preferably, the first display object composes a background of a game screen while the second display object composes a character displayed on the background. Further, of the first display object, only a portion in which the precedence of the polygon data needs to be determined is composed of the simple model.

For example, preferably, the simple model is three dimensional data composed of polygon data set up roughly.

According to another aspect of the image processing apparatus of the present invention, there is provided an image processing apparatus wherein a first display object including a movie image and a second display object composed of solid image of polygon data are displayed on a display means, the image processing apparatus having an image processing means in which a virtual camera for the second display object is set up and when the second display object moves over the first display object, motion of the virtual camera is controlled so that a position of the virtual camera substantially coincides with a camera angle with respect to the first display object and when the second display object moves over the first display object in an inverse direction, the first display object is reproduced with the inverse motion while the position of the virtual camera substantially coincides with the camera angle with respect to the first display object moving in the inverse motion.

Preferably, when the second display object moves from one section to other section of multiple sections produced by dividing a region in which the second display object should move of the first display object, a position of the virtual camera substantially coincides with a camera angle in each of the sections.

On the other hand, to achieve the first object, according to an aspect of the image processing method of the present invention, there is provided an image processing method for displaying a first display object composed of a movie image and a second display object composed of solid image of polygon data on a display means, the image processing method comprising setting up of a simple model composed of three dimensional data in part of the first display object while determining the precedence in erasing the negative face of the second display object using the simple model.

Further, according to another aspect of the image processing method of the present invention, there is provided an image processing method for displaying a first display object composed of a movie image and a second display object composed of solid image of polygon data on a display means, wherein a virtual camera for the second display object is set up and when the second display object moves over the first display object, motion of the virtual camera is controlled so that a position and angle of the virtual camera substantially coincide with a camera position and angle with respect to the first display object and when the second display object moves over the first display object in an inverse direction, said first display object is reproduced with the inverse motion while the position of the virtual camera substantially coincides with the camera angle with respect to the first display object moving in the inverse motion.

Further, there is provided a recording medium including a program for making a computer act as an image processing means or image processing method according to any one of the above described aspects.

By using the movie image in part of the background or the like to be displayed on a display means, as described above, screen representation can be diversified and the freedom of representation can be increased. At the same time, a drawing processing load is reduced remarkably and a moving state of a display object such as character on the movie screen can be represented smoothly.

Further, to achieve the second object of the present invention, there is provided an image processing apparatus wherein an image having a motion of an object existing in a virtual space is displayed on a screen of a display means in linkage with sound data. Preferably, a display control means for displaying a motion of the object in linkage with a beat of the sound data is further comprised.

Further, the image processing apparatus may further comprise a reproducing means for reproducing sound based on the sound data, wherein the display control means has: a first obtaining means for obtaining reproduction information of sound data by the reproducing means; a computing means for computing a reproduction position of a game with reference to the reproduction information of the sound data obtained by the obtaining means; a second obtaining means for obtaining data of the virtual camera and motion of the object based on a computation result of the computing means and motion progress data; and a generating means for generating image data for displaying motion of the object on a monitor screen.

Further, preferably, the first obtaining means is a means for obtaining reproduction sample number (ncount) and sampling frequency (freq) of sound data by the reproducing means and the computing means is a means for computing current frame number (frame) and beats with reference to the reproduction sample number (ncount) and sampling frequency (freq).

For example, the computing means is a means for computing current frame number (frame) and beats according to:

$$\text{frame} = ncount * FPS / freq$$

$$\text{beat} = \text{frame} / fpb$$

(where FPS is a frame number per second and fpb is a frame number per beat).

Further, the motion progress data may be data for allocating motions corresponding to beats of the sound data in time series.

Preferably, the virtual camera data is viewpoint information of the virtual camera in the virtual space and the generating means has a means for generating image data of the object with a movie image having viewpoint information coinciding with viewpoint information of the virtual camera as a background image.

Further, the generating means may be a means for generating the image data according to any one of the first generating mode for automatically setting motion of the object and the second generating mode for reflecting operation information from a player to motion of the object.

Further, the display control means comprises a means for forming a background image to be supplied to the object separately from the object image and a synthesizing means for synthesizing the object image with the background image in a state in which at least one of disposition conditions about the camera viewpoint and light source with respect to the object image and the background image is set substantially the same.

For example, the background image is a movie image.

Further, preferably, the sound data is supplied as ADX data which is ADX compressed.

Further, there is provided a recording medium for recording a program for making a computer carry out each of the respective means of the image processing apparatus which achieves the second object.

Consequently, it is possible to provide so-called music game in which the motion of an object on the screen dances with music. This game can be processed easily and flexibly with less computation amount without depending on any complicated control.

Meanwhile, the aforementioned recording medium includes, for example, floppy disc, hard disc, magnetic tape, CD-ROM, CD-R, DVD, ROM cartridge, battery back-up RAM memory cartridge, flash memory, involatile RAM card and the like. Further, the recording medium includes communication medium including wire communication medium such as telephone line and wireless communication medium such as micro wave. The Internet is also included in the communication medium mentioned here. In conclusion, any means having a predetermined function by down-loading a program on the computer is included in the recording medium of the present invention.

DESCRIPTION OF THE PREFERRED EMBODIMENTS

The first embodiment of the present invention will be described with reference to FIGS. 1 to 9.

[General]

Figure 1:
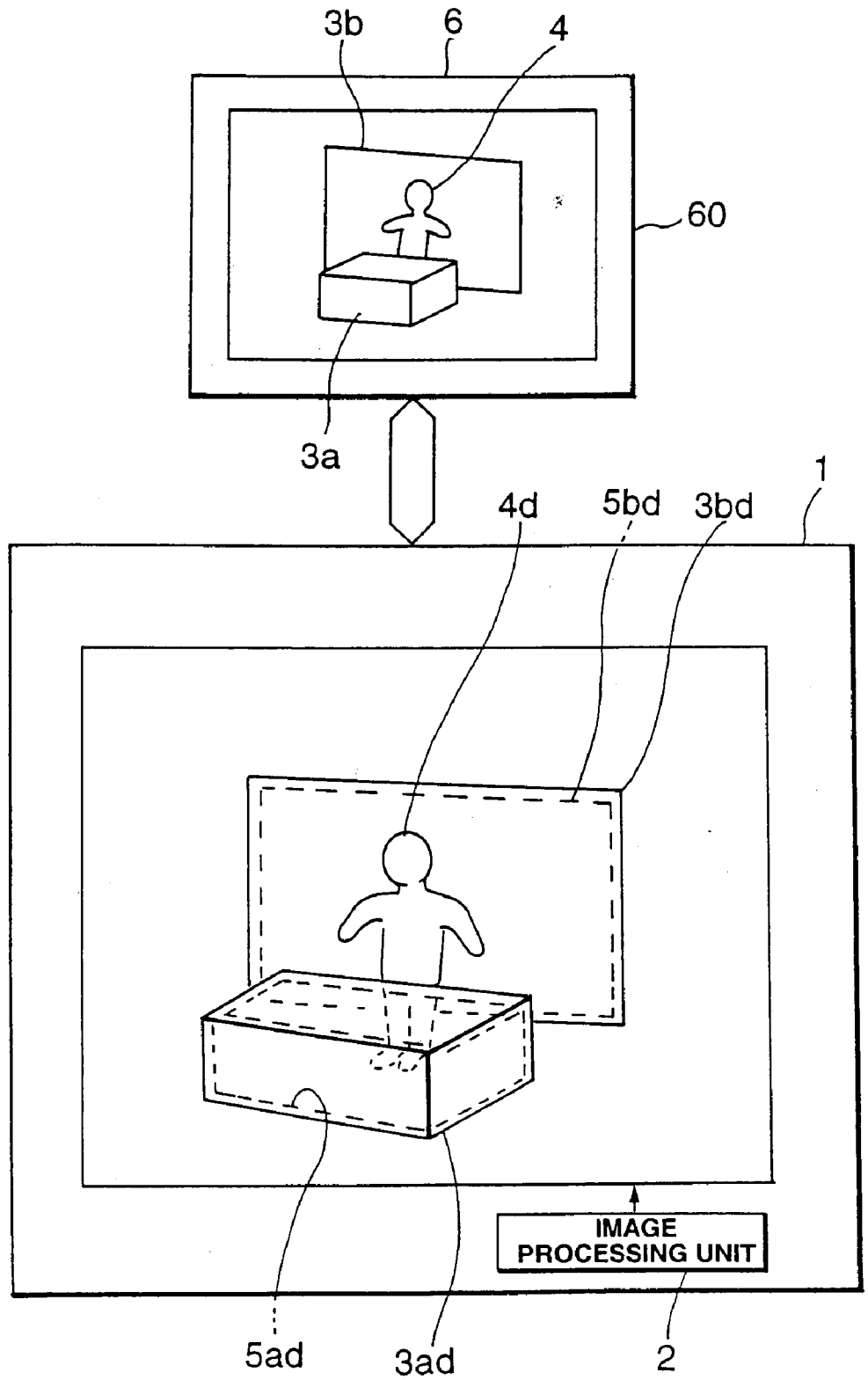
FIG. 1 is an explanatory diagram for explaining an outline of a first embodiment of the present invention.

FIG. 1 is an explanatory diagram for explaining an outline of the first embodiment.

In FIG. 1, reference numeral 1 denotes a game apparatus such as a TV game apparatus in which an image processing unit of the present invention is executed. This game apparatus 1 is capable of carrying out a game software. If this TV game carries out the game software, an image processing means 2 is achieved in the TV game apparatus 1.

As shown in FIG. 1, the image processing means 2 carries out image processing for background image data 3d (first displayed object) composed of movie image based on computer graphics and game character data 4d (second displayed object) composed of three-dimensional image based on polygon data. Additionally, simple models 5ad, 5bd composed of three-dimensional data are set up in order to determine the priority in erasing a negative face of the character in part of the background and the like. This simple model 5ad is indicated with dot line along a desk data 3ad as shown in FIG. 1. Likewise, a simple model 5bd is indicated with dot line along a contour of wall face 3bd as shown in FIG. 1. Although these simple models 5ad, 5bd are indicated inside the contour for convenience for creation of this figure, actually the solid lines and dot lines are located at the same position.

This image processing means 2 determines the priority between the character data 4d and the simple model 5ad and at the same time, determines the priority between the character data 4d and the simple model 5bd. Because the character data 4d is located behind the simple model 5ad in this case, the image processing means carries out processing for erasing a portion of the character data 4d which is hidden by the simple model 5ad. Further, because the character data 4d is located in front of the simple model 5bd, the image processing means 2 carries out processing for erasing a portion thereof corresponding to a rear portion of the character data 4d taking precedence upon the character data 4d.

The image processing means 2 executes the aforementioned image processing and synthesizes the character data 4d with the background scene data 3d and after that, converts this synthesis data to video signal and then supplied to the display 6. Consequently, as shown in FIG. 1, the display represents an image 60 in which the character 4 stands behind the desk 3a and in front of the wall face 3b.

Hereinafter, this game apparatus will be described.

[Construction of Game Apparatus]

Figure 2:
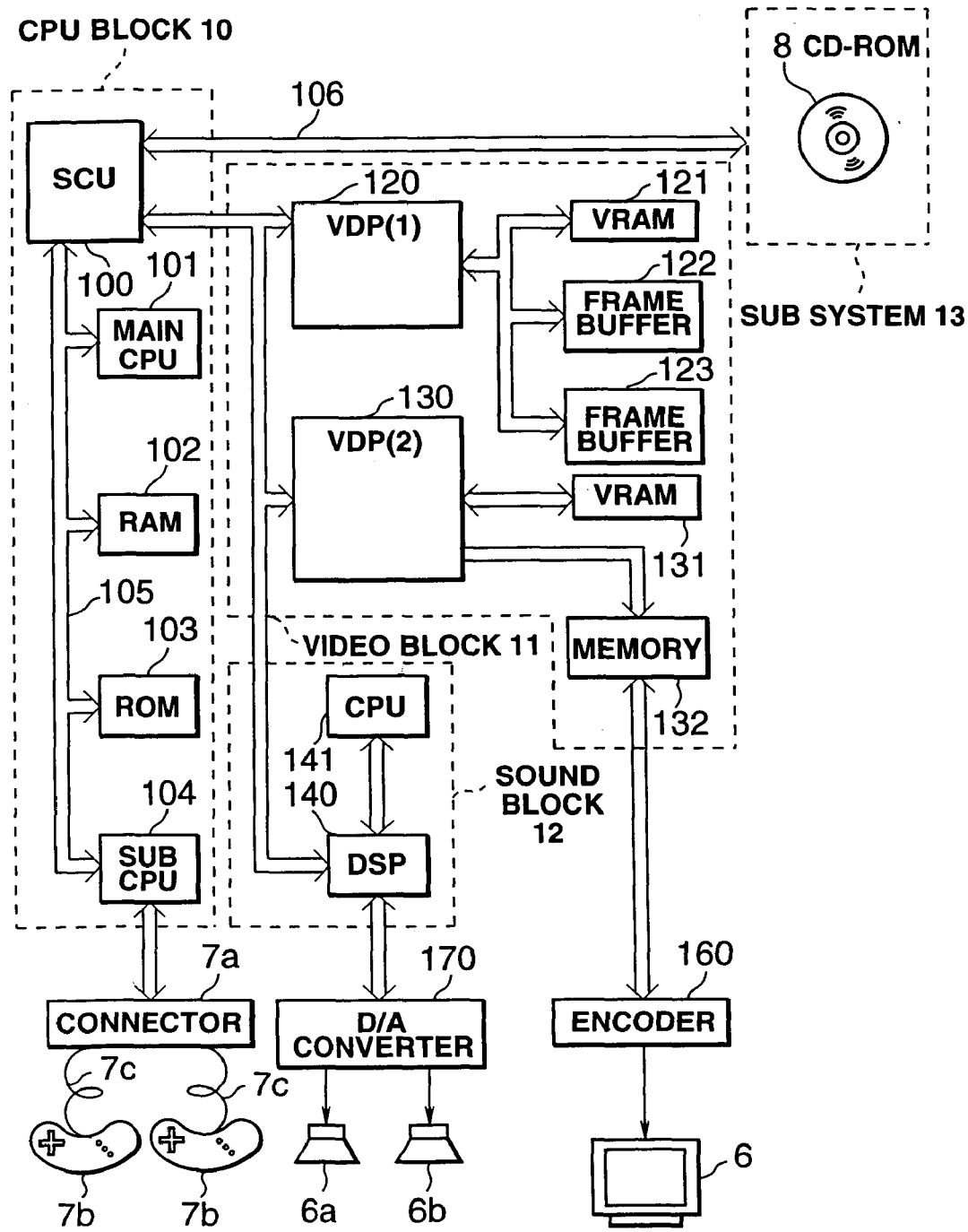
FIG. 2 is a block diagram showing an outline of a game apparatus using an image processing unit of the first embodiment.

FIG. 2 is a block diagram showing an outline of this game apparatus. This game apparatus 1 comprises CPU block 10 for controlling the entire unit, video block 11 for controlling a display on the game screen, sound block 12 for generating an effect sound and the like, sub-system 13 for reading out from a CD-ROM 9 and the like.

The CPU block 10 comprises a SCU (system control unit) 100, main CPU 101, RAM 102, ROM 103, sub CPU 104, CPU bus 105 and the like.

The main CPU 101 controls the apparatus entirely. This main CPU 101 includes the same operation function as DSP (digital signal processor) internally so that it is capable of executing the application rapidly. The RAM 102 is used as work area of the main CPU 101. An initial program and the like for initialization are written in the ROM 103. The SCU 100 controls the buses 105, 106 and 107 so as to execute data input/output between the main CPU 101, VDP 120, 130, DSP 140, CPU 141 and the like smoothly. The SCU 100 is provided with a DMA controller internally so that it is capable of transmitting split data in the game to VRAM in the video block 11. Consequently, application software for a game and the like can be executed rapidly.

The sub CPU 104 is called SMPC (system manager & peripheral control) and has a function for collecting peripheral data from PAD 7b as a control unit (peripheral) through a cable 7c and connector 7a. The main CPU 101 carries out processing for moving a character in the game screen and the like according to the peripheral data received from the sub CPU 104. Any peripheral such as PAD, joy stick and key board can be connected to the connector 7a. The sub CPU 104 automatically recognizes the kind of the peripheral connected to the connector 7a (terminal on the side of the main body) so as to collect the peripheral data and the like according to communication system depending on the kind of the peripheral.

The video block 11 comprises VDP (video display processor) for drawing character composed of polygon data and VDP 130 for drawing the background scene, synthesis of polygon image data and background image, clipping processing and the like.

The VDP 120 is connected to the VRAM 121 and frame buffers 122, 123. Polygon drawing data indicating the character of the video game apparatus is transmitted from the main CPU 101 to the VDP 120 through the SCU 100 and written into the VRAM 121. The drawing data written into the VRAM 121 is drawn into a drawing frame buffer 122 or 123 in the form of 16 or 8 bits/pixel. The drawn data of the frame buffer 122 or 123 is transmitted to the VDP 130. Information about control on drawing is supplied from the main CPU 101 to the VDP 120 through the SCU 100. Then, the VDP 120 carries out the drawing processing according to this information.

The VDP 130 is connected to the VRAM 131 so that image data outputted from the VDP 130 is outputted to an encoder 160 through a memory 132. The encoder 160 generates video signal by adding synchronous signal and the like to this image data and outputs to the TV display 6. Consequently, the game screen is displayed on the TV display 6.

The sound block 12 comprises DSP 140 for carrying out voice synthesis based on PCM method or FM method and CPU 141 for carrying out control and the like on this DSP 140. Sound data generated by the DSP 140 is converted to 2-channel signal by a D/A converter 170 and outputted to speakers 6a, 6b.

This sub-system 13 has a function for reading application software supplied through CD-ROM 8 so as to reproduce animation or the like.

[Operation of the Game Apparatus]

Next, the operation of the aforementioned game apparatus will be described based on FIG. 1 with reference to FIGS. 2 to 9. First of all, an operation flow of the entire system will be described with reference to FIG. 3.

Figure 3:
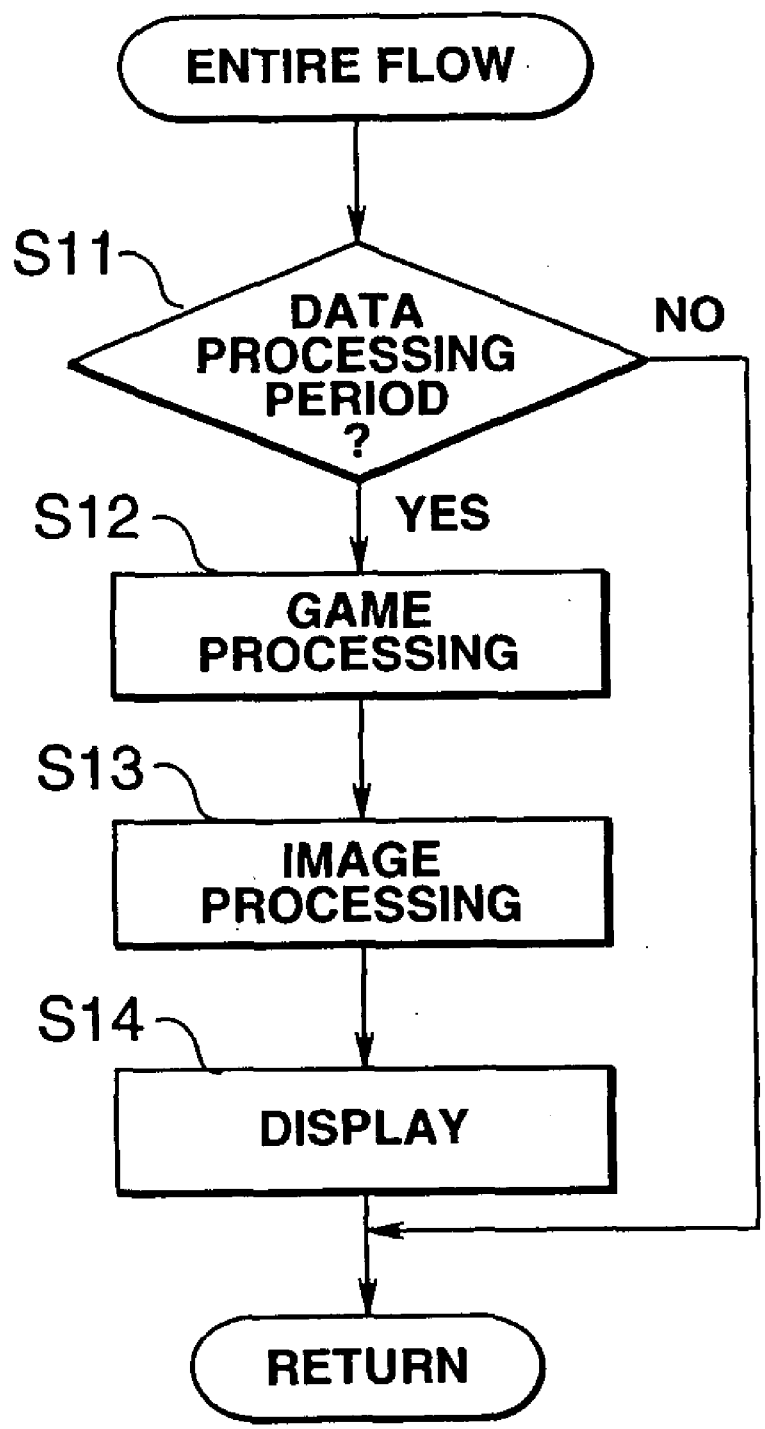
FIG. 3 is a flow chart for explaining an entire operation of the first embodiment.

In the game apparatus 1, the main CPU 101 enters this entire flow chart of FIG. 3 every predetermined time and unless it is located at data processing period (S11; NO), the main CPU 101 escapes from this processing. If it is located in the data processing period (S11; YES), the processing proceeds to subsequent steps.

First, the main CPU 101 executes game processing (S12). That is, in step 12, the main CPU 101 progresses the game based on matters necessary for game processing, for example, game software, data memorized corresponding to progress of game, peripheral data supplied from the PAD 7b and the like.

Next, the main CPU 101 achieves the image processing means 2. The image processing means 2 fetches background scene data composed of movie screen based on computer graphics according to data for progress of the game obtained in a previous step and then fetches data of character to be disposed in the background so as to carry out image processing on these data (S13).

According to the first embodiment, a simple model (mask model) composed of polygon along contours of parts in the background is set up preliminarily in the background scene data composed of the movie screen. The image processing means 2 determines the priority between the simple model composed of polygon and the character data composed of polygon. If it is determined that the simple model has a precedence over the character data, the image processing means 2 disposes that model on the character data at a portion where the simple model overlaps the character data so as to process so that the background scene data is displayed on that model portion.

On the other hand, if it is determined that the character data has a higher precedence over the simple model, the image processing means 2 processes so that the character data has precedence at a portion where the simple model overlaps the character.

Corresponding to such a condition, video signal produced in a video block 11 composing part of the image processing means 2 is supplied to the display 6 (S14). Consequently, an image in which the character composed of polygon is disposed within a fine, beautiful background scene based on the movie screen is displayed on the display 6. This is display as if the character is moving within the background screen represented three-dimensionally.

[Example of Image and Image Data]

First of all, an example (see FIG. 5) of the screen displayed on the display will be described.

The configuration of image data will be described in a following order. Namely, first, an example in which all image data are composed of polygon data (see FIG. 6) will be described and next, an example in which of the image data (see FIG. 7), for example, the background image data is formed with movie image data based on computer graphics and then a simple model is set up with polygon data at a position in which the negative face of this background is to be erased will be described. Further, an example of image data in which the precedence of the simple model and the character composed of polygon data can be compared (see FIG. 8) will be described.

A. Example of Image Displayed on the Display

Figure 5:
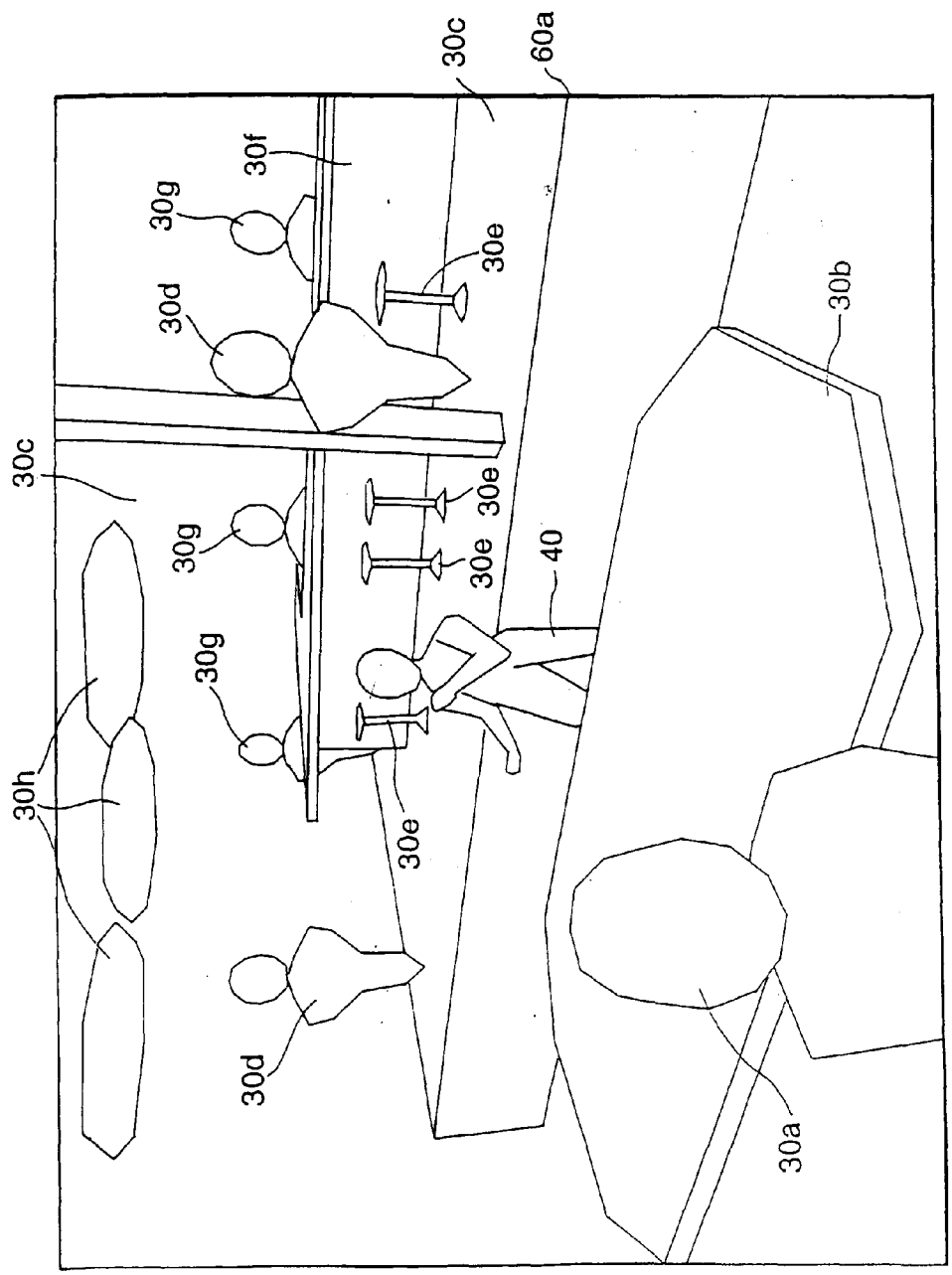
FIG. 5 is an explanatory diagram of a screen displayed on a display according to the first embodiment.

FIG. 5 is an explanatory diagram of a screen displayed on the display. As shown in FIG. 5, it is assumed that a content shown in for example, a screen 60a is displayed on the display. A first enemy 30a is disposed in the forefront of this screen 60a and a desk 30b, a character 40 and a grid shaped partition 30c are disposed in this sequence along the depth of the screen. Then, behind this partition 30c, second enemies 30d, 30d, and chairs 30e, 30e, are disposed. Further, there are disposed counter 30f behind the chairs 30e, 30e, and a third enemy 30g is disposed inside this counter 30f. Meanwhile, a chandelier 30h is disposed over the desk 30b.

B. Example That all Image Data are Composed of Polygon Data

Figure 6:
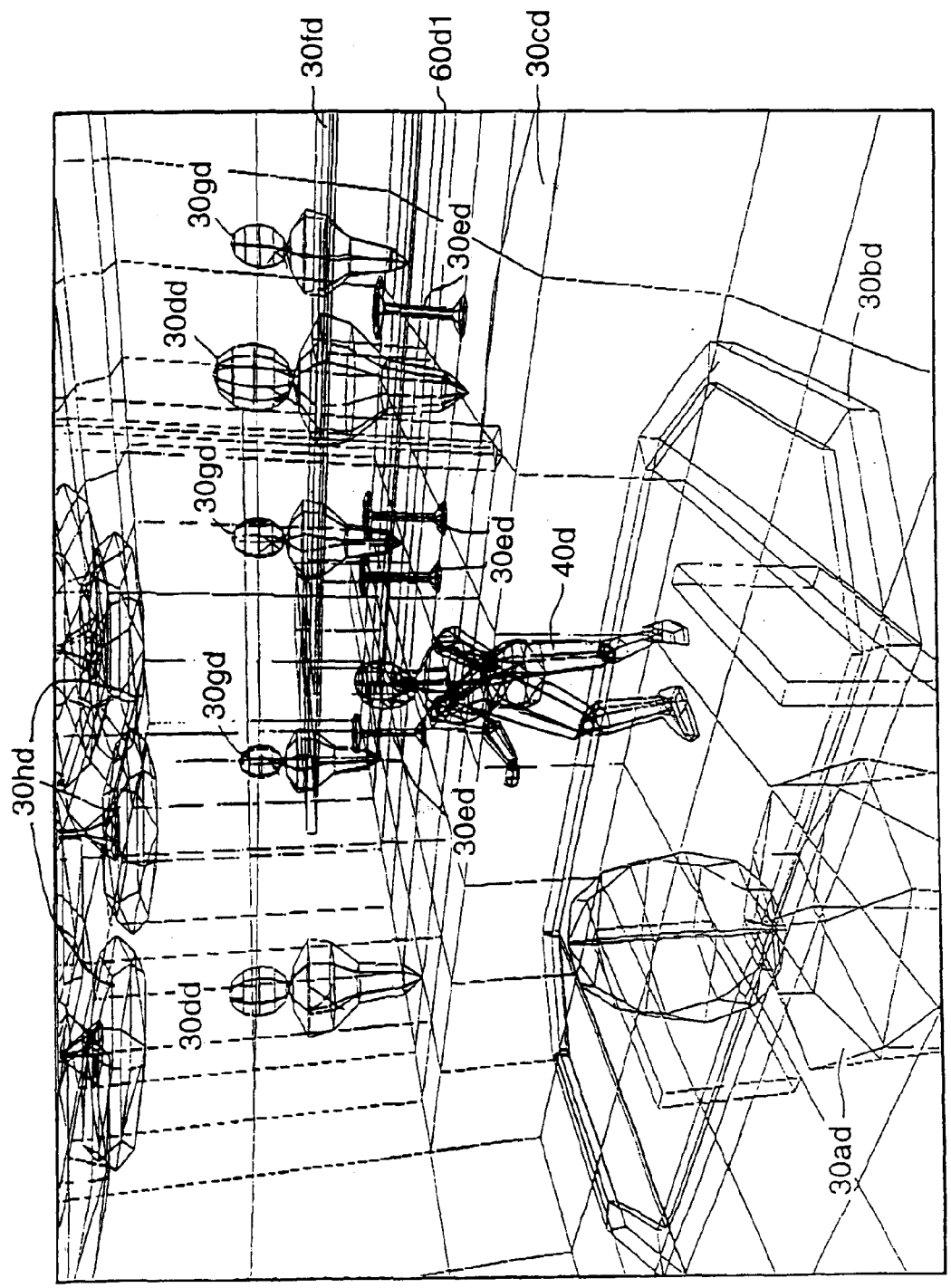
FIG. 6 is an explanatory diagram for a case where an entire screen is created with polygon.

FIG. 6 is an explanatory diagram showing a case where all the screen 60a shown in FIG. 5 is created with polygon data. If it is intended to create the aforementioned screen 60a entirely with polygon data in FIG. 6, it is necessary to create an image data 60d1 as follows. That is, the first enemy data 30ad composed of polygon data is disposed in the forefront of the screen data 60d1. Next, desk data 30bd and chandelier data 30hd composed of polygon data are disposed behind the first enemy data 30ad.

Then, character data composed of polygon data is disposed behind this desk data 30bd. Behind the character data 40d are disposed grid shaped partition data 30cd, second enemy data 30dd, 30dd, and chair data 30ed, 30ed, . . . in this sequence. Further, counter data 30fd is disposed behind the chair data 30ed, 30ed, and third enemy data 30gd, 30gd, are disposed inside of the counter data 30fd. In this case, to represent the displayed image 60 in a fine texture, a large amount of polygon data is necessary. However, in this case, a processing load of the main CPU 1 and video block 11 of the game apparatus 1 increases so that there is a fear that other processing may not be carried out.

C. Example in Which Part of Image Data (Background) is Composed of Simple Polygon Data FIG. 7 is an explanatory diagram showing a case where a portion composed of polygon data is limited to only the background while the other background portion is composed with the movie screen based on computer graphics.

Figure 7:
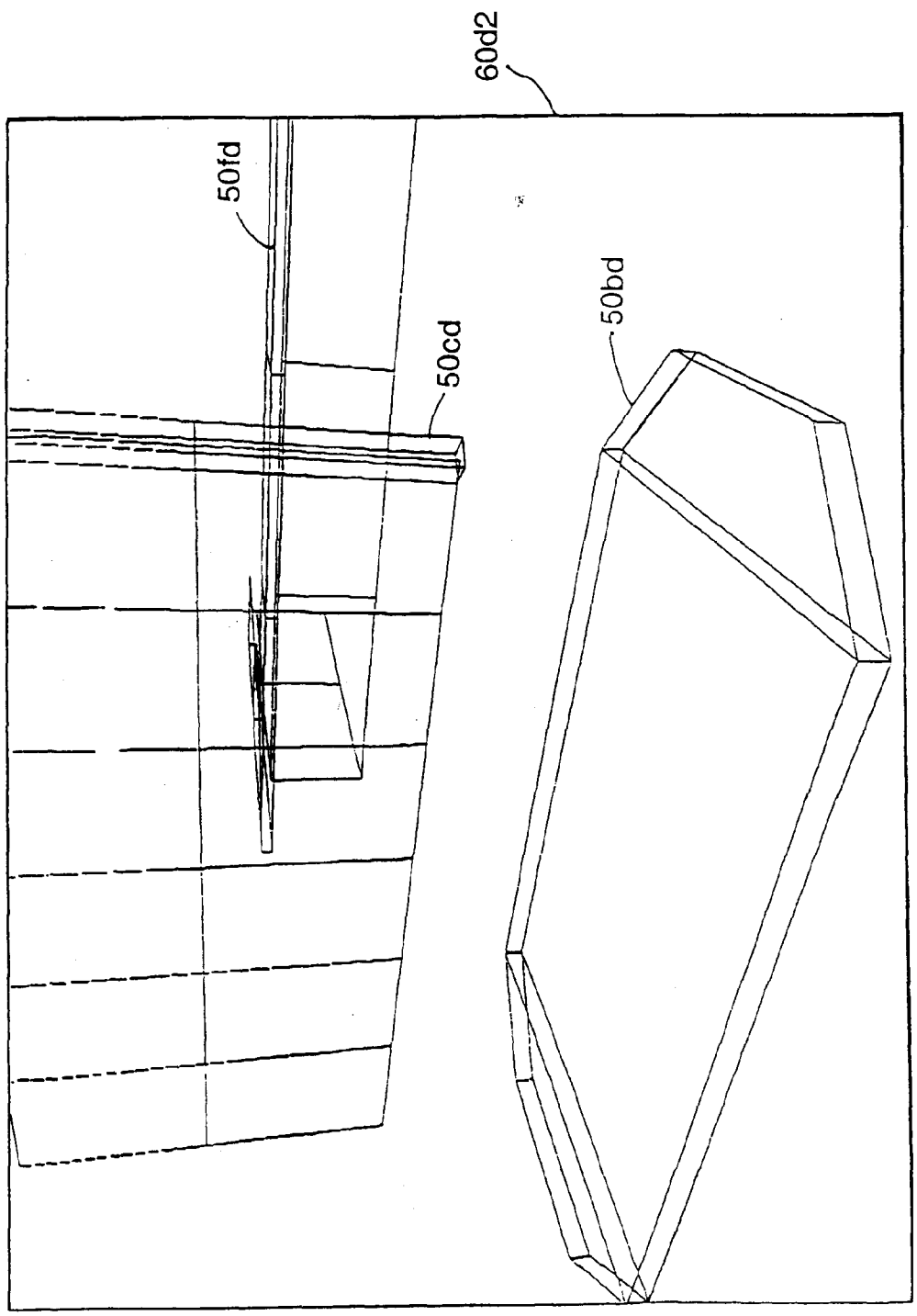
FIG. 7 is an explanatory diagram for a case where only part of a background of the first embodiment is composed of polygon data while the background portion is composed of movie screen created by computer graphics.

As evident from FIG. 7, according to the first embodiment, simple models 50*bd*, 50*cd*, 50*fd* composed of slight amount of polygon data are disposed in a portion in which the precedence is determined between the background screen data 30 and character data 40*d* within the background screen data 30 composed of movie screen. The movie screen has (a): call address corresponding to cord address, (b): frame image data, (c): intra-frame object (simple model) data, and (d): movie course data (camera motion information).

Here, the simple model 50*bd* is disposed, for example, at the contour of the desk portion of the background screen composed of movie screen. Further, the simple model 50*cd* is disposed, for example, at the contour of the grid of the background composed of movie screen. Further, the simple model 50*fd* is disposed, for example, at the contour of the counter portion of the background composed of movie screen. As understood from this figure, the respective simple models 50*bd*, 50*cd*, and 50*fd* are supplied as data 60*d*2 composed of a small number of polygon data.

Figure 8:
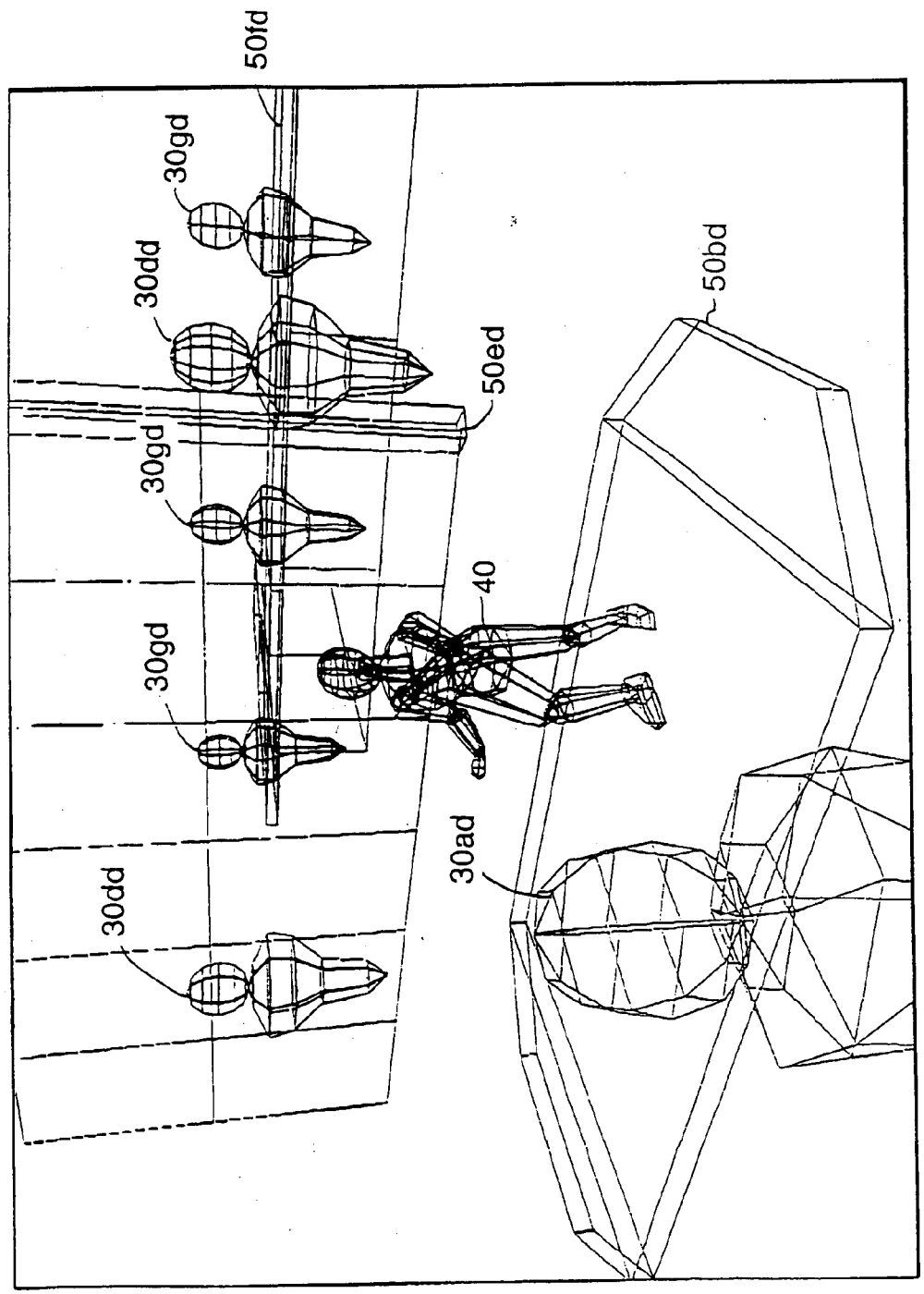
FIG. 8 is an explanatory diagram showing a relation between a simple model in which only part of the background of the first embodiment is composed of polygon data, character and the others.

D. Example in Which Part of the Image Data (Background) is Composed of Simple Polygon Data While Characters are Disposed Therein FIG. 8 is an explanatory diagram showing a relation between the simple model, character and the like while only part of the background is composed of a slight amount of polygon data. According to the first embodiment, as shown in FIG. 8, the character data 40d is composed of a large number of polygon data. Further, the first-third enemy data 30*ad*, 30*bd*, and 30*cd* are composed of a large number of polygon data.

In the environment, the first enemy data 30*ad* is disposed in front of the simple model 50*bd* disposed at the desk and the character 40*d* is disposed behind the simple model 50*bd* disposed at the desk and in front of the simple model 50*ed* disposed at the grid. The second enemy 30*bd* is disposed behind the simple model 50*ed* disposed at the grid and in front of the simple model 50*fd* disposed at the counter. Then, the third enemy 30*gd* is disposed behind the simple model 50*fd* disposed at the counter.

E. Example of Data Configuration

Figure 9:
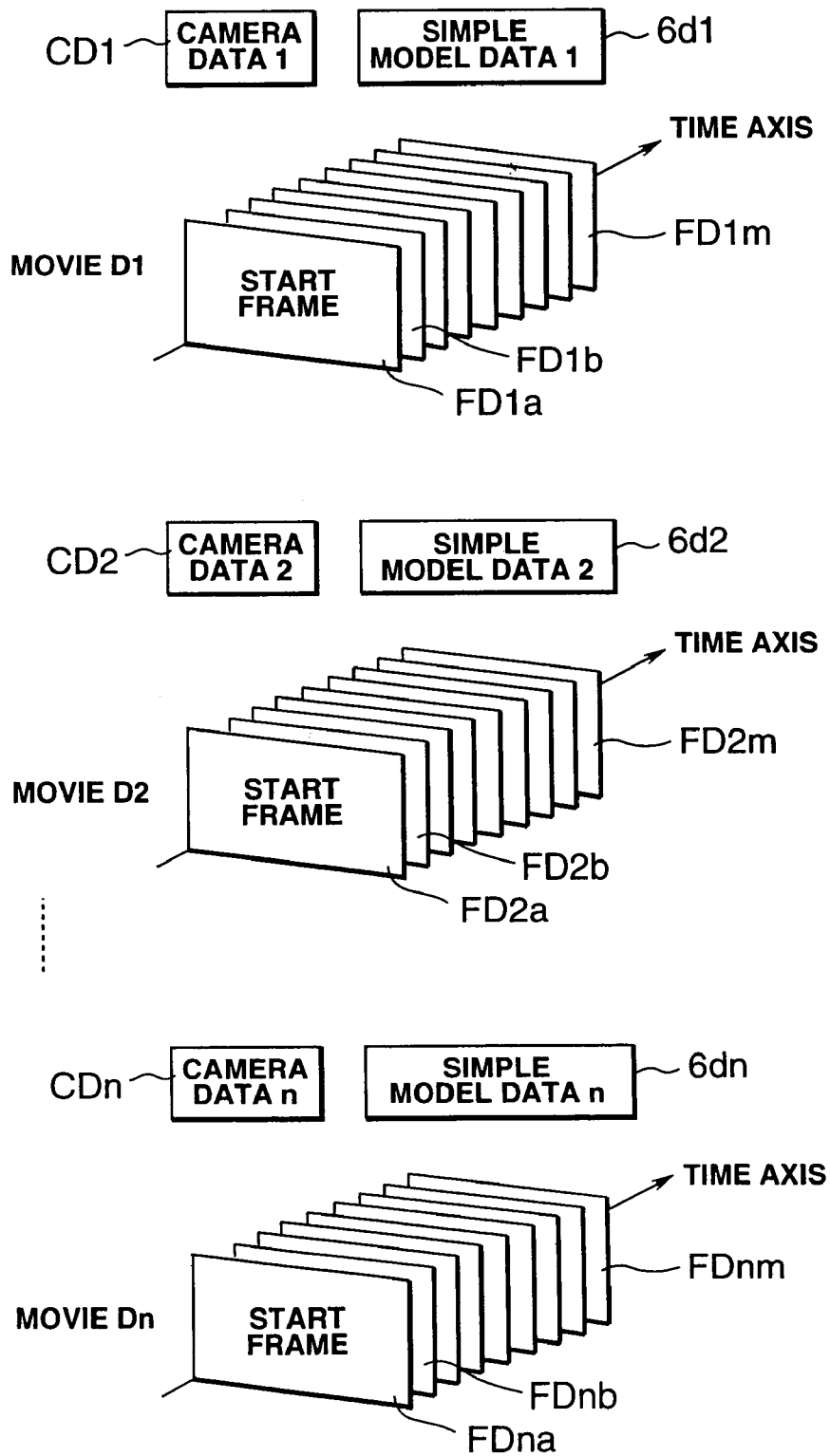
FIG. 9 is an explanatory diagram showing an example of data possessed by the movie screen of the first embodiment.

FIG. 9 is an explanatory diagram showing an example of data configuration possessed by the movie screen of the first embodiment.

This movie image of computer graphics has movie data D1, D2, . . . Dn. The movie data D1, . . . D2, . . . Dn have frame image data FD1*a*, FD1*b*, FD1*m*. The movie data D1, D2, . . . Dn have camera motion data CD1, CD2, . . . CDn and simple model data 6*d*1, 6*d*2, . . . . 6*dn* within the frame.

Further, it is possible to create continuous video image by, with the frame image data FD1*a*, FD1*b*, . . . FD1*m* as reference frame, interpolating between for example, the frame image data FD1*a* and frame image data FD1*b*, between the frame image data FD1*b* and frame image data FD1*c*, between the frame image data FD1*c* and the frame image data FD1*d*, . . . .

[Concrete Operation of Image Processing]

Figure 4:
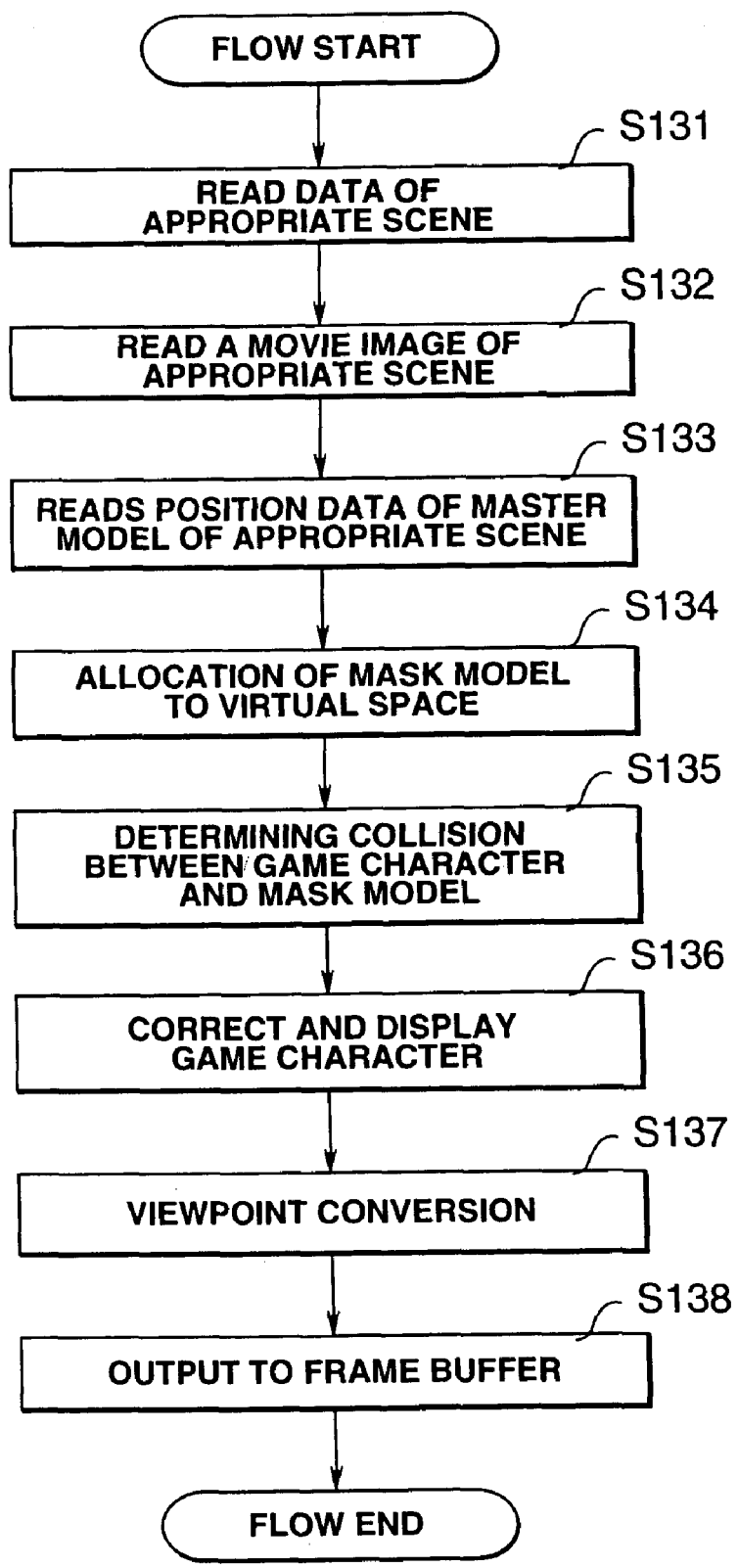
FIG. 4 is a flow chart for explaining an operation of the image processing of the first embodiment.

Next, image processing to be carried out in step S13 of FIG. 3 will be described. FIG. 4 is a flow chart for explaining a concrete operation of the image processing.

In FIG. 4, the image processing means 2 reads scene data obtained by executing the game software (S131). Next, the image processing means 2 reads frame data FD1*a* of a scene corresponding to the movie data D1 shown in FIG. 9 for example, based on its corresponding scene data obtained in a previous step (S132). This movie screen has (a): call address corresponding to cord address, (b): frame image data, (c): intra-frame object (simple model) data, and (d): movie course data (camera motion information).

The image processing means 2 reads simple model data (for example, mask model as shown in FIG. 7) of a corresponding scene (S133). The simple model (mask model) of this case is colorless object.

Next, the image processing means 2 disposes the aforementioned simple model in virtual space as shown in FIG. 8 (S134). Then, the image processing means 2 determines a collision between game character data and simple model using Z sort method or Z buffer method based on the image data shown in FIG. 8 (S135).

On the basis of result of such a determination, the image processing means 2 corrects and displays game character (S136). After that, the image processing means 2 carries out viewpoint conversion processing on the basis of data relating to the aforementioned movie screen (S137) and outputs data of its processing result to the frame buffers 122, 123 (S138).

As a result of such an image processing, the screen 60*a* shown in FIG. 5 is displayed on the display 6.

As for advantages of this embodiment, use of the movie screen based on computer graphics enables to display a fine, beautiful screen and a load for image processing by the game apparatus is low.

Further, according to this embodiment, the simple model composed of a small amount of polygon data is disposed to mask part of the background and then, a collision between the background and game character is checked. Consequently, equivalent three-dimensional representation is possible. That is, according to the first embodiment, use of the movie screen for part of the screen diversifies screen representation and reduces drawing processing remarkably, and a motion of an displayed object moving on this movie screen can be represented more smoothly.

Second Embodiment

The second embodiment of the present invention will be described with reference to FIGS. 11 to 14.

Figure 10:
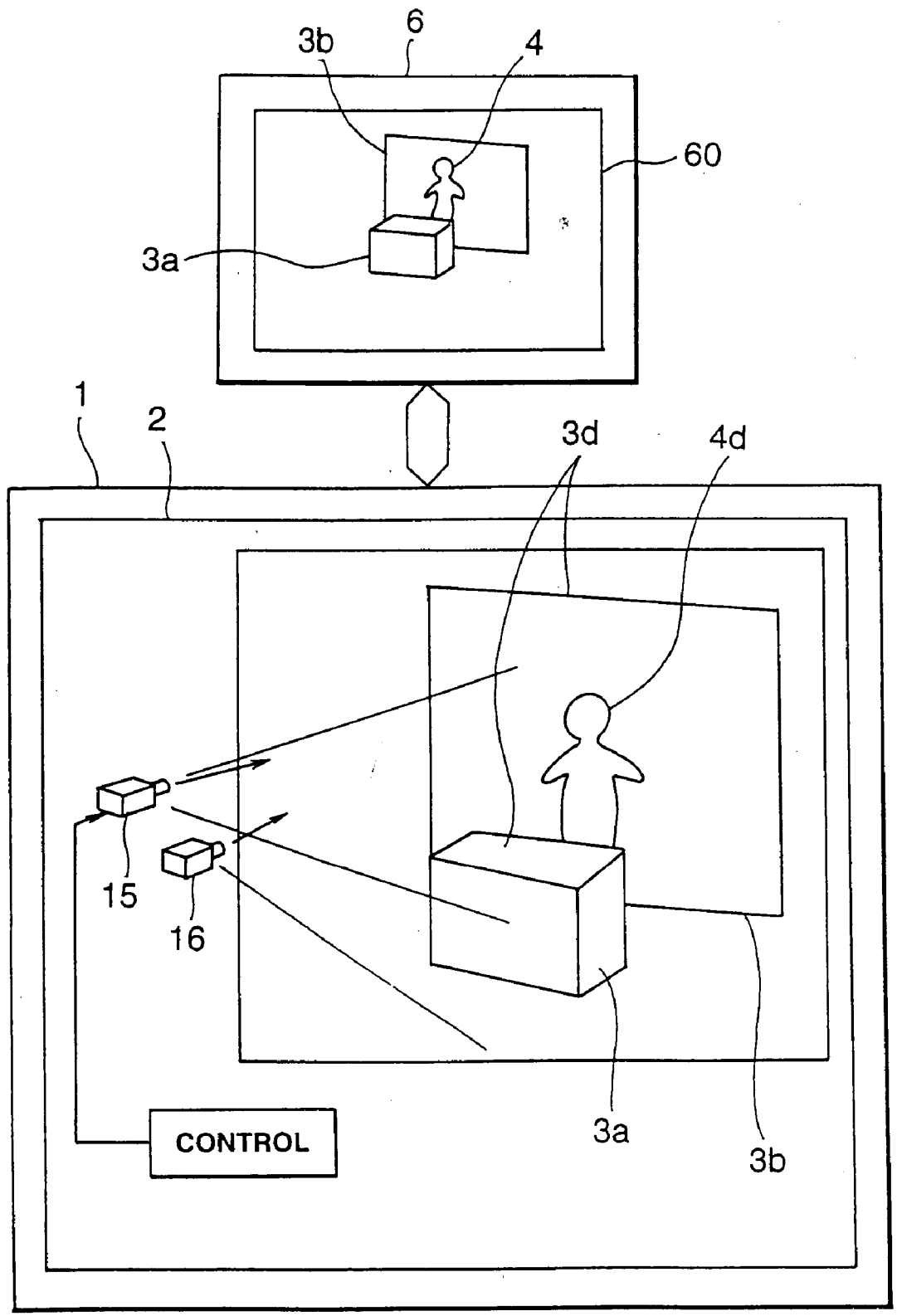
FIG. 10 is a diagram for explaining an outline of a second embodiment of the present invention.

FIG. 10 is a diagram for explaining an outline of image processing of the second embodiment of the present invention.

In FIG. 10, the image processing means 2 is achieved in the game apparatus 1 such as the TV game apparatus as described above.

As shown in FIG. 10, the image processing means 2 carries out image processing for background image data 3*d* (first displayed object) composed of movie image based on computer graphics and game character data 4*d* (second displayed object) composed of three-dimensional image based on polygon data and supplies to the display 6. Consequently, as shown in FIG. 10, an image 60 in which the character 4 stands behind the desk 3*a* and in front of the wall face 3*b* is displayed on the display 6.

The image processing means 2 sets up a virtual camera 15 to the background image data 3*d* and controls a motion of the virtual camera 15 so that a position of the aforementioned virtual camera 15 substantially coincides with an angle of the camera 16 with respect to the background image data 3*d* when the game character data 4*d* moves on the background image data 3*d*. On the other hand, if this game character data 4d moves in an opposite direction on the aforementioned background image data 3d, the aforementioned background image data is reproduced in an inverse motion and the position of the virtual camera 15 is made to substantially coincide with the angle of the camera 16 with respect to the background image data 3d.

At this time, the image processing means 2 divides a region in which the game character data 4d must move of the background image data 3d into multiple sections and when the character data 4d moves from one section to other section, it is so controlled that the virtual camera virtually photographs an image accompanied by this motion and substantially coincides with an angle of the camera 16 at the first position of the other section.

In the second embodiment, a game apparatus having the same hardware configuration as the game apparatus 1 used in the first embodiment is used. Therefore, like reference numerals are attached to the same or similar components and a description thereof is omitted.

The game apparatus 1 of this embodiment carries out various image processings by means of mainly the CPU block 10 in a following manner.

Figure 11:
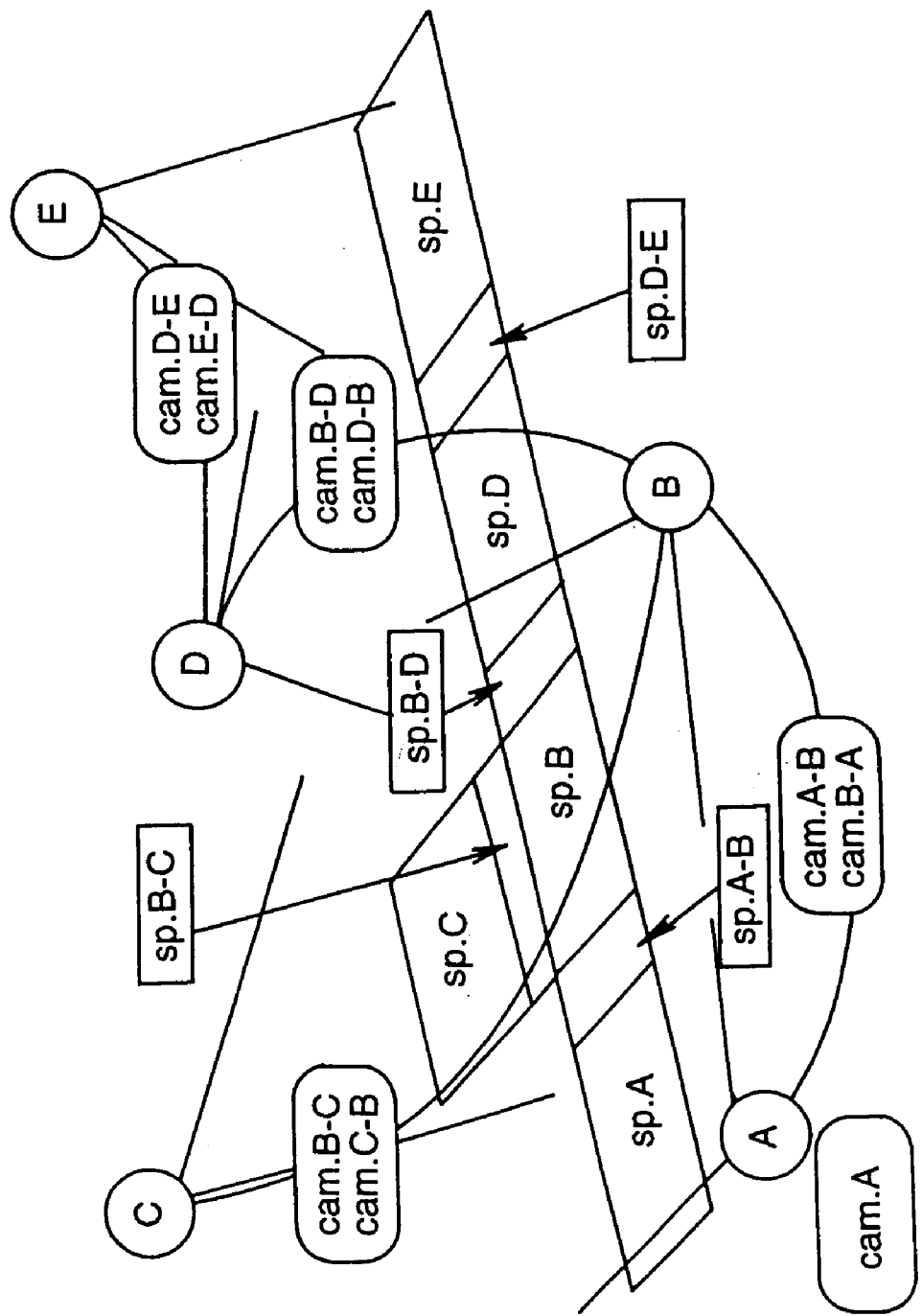
FIG. 11 is a diagram for explaining a motion example of the second embodiment.
Figure 12:
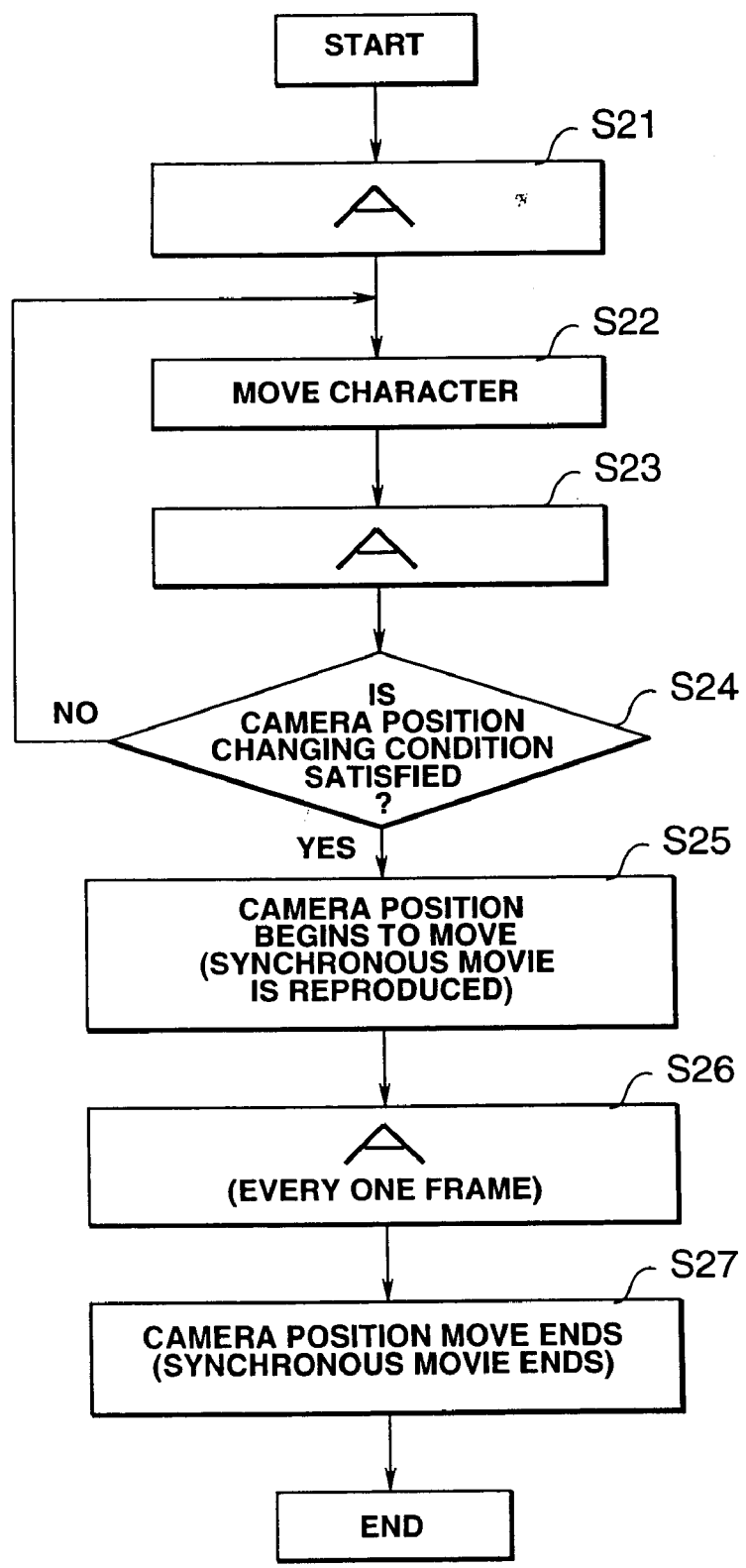
FIG. 12 is a flow chart for explaining a motion of the second embodiment.
Figure 13:
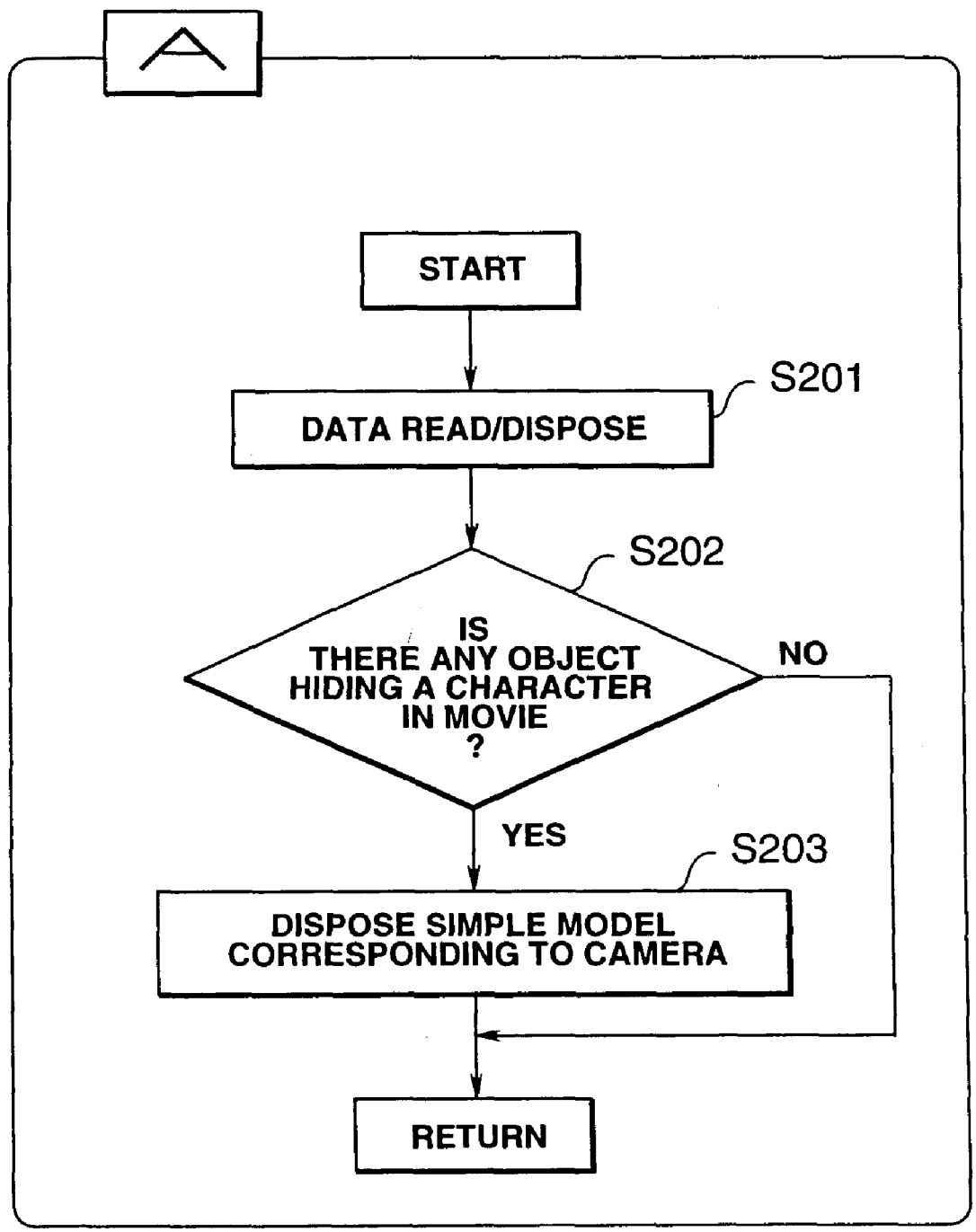
FIG. 13 is a diagram of a subroutine employed in FIG. 12.
Figure 14:
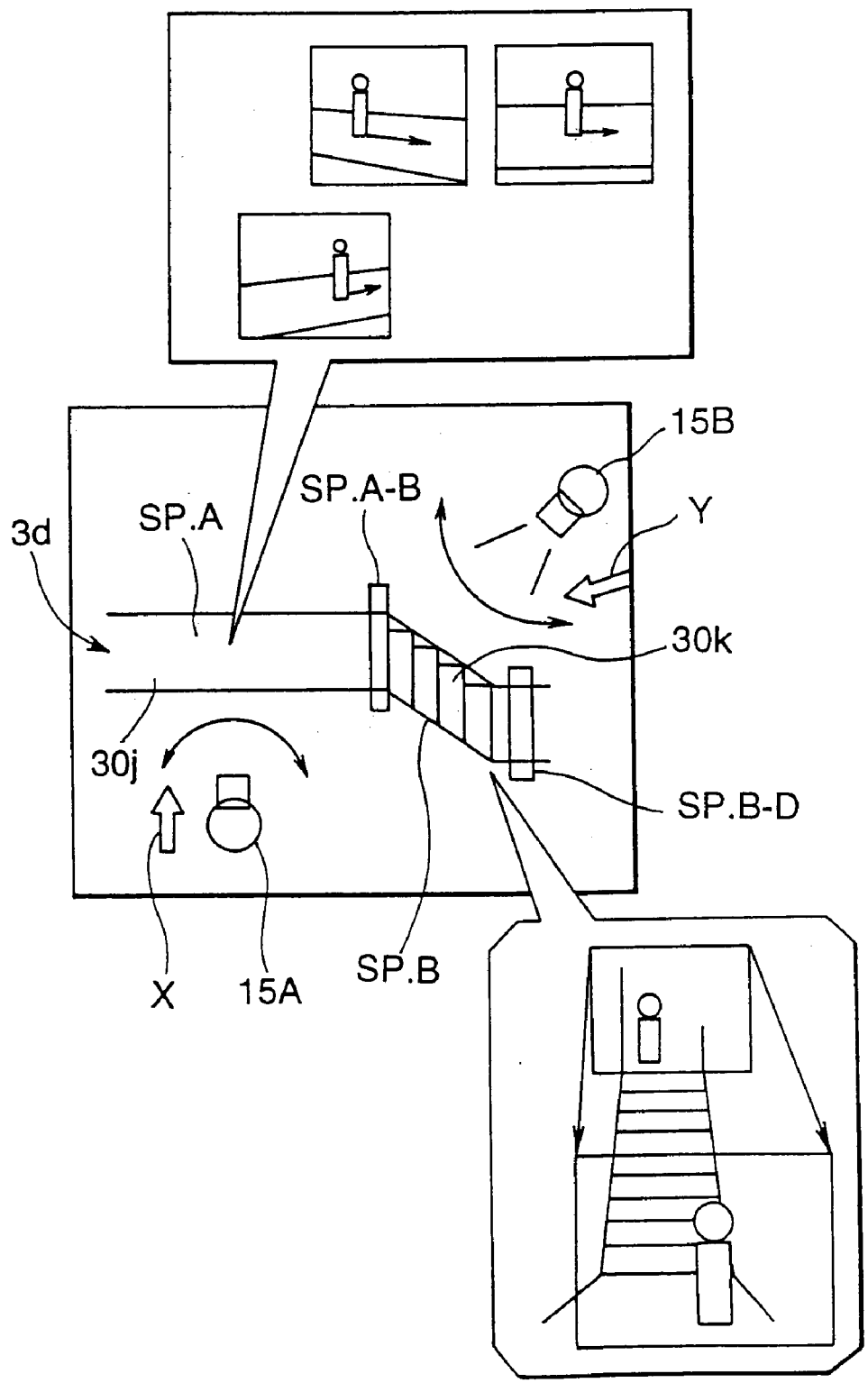
FIG. 14 is a diagram showing an example of motion in the second embodiment.

FIG. 11 is a diagram showing an example of motion of the second embodiment. FIG. 12 is a flow chart for explaining the motion. FIG. 13 is a sub-routine of FIG. 12. FIG. 14 is a diagram showing an example of representation of the motion.

In FIG. 11, regions sp.A, sp.B, sp.C, sp.D, sp.E, ..., and overlapping region sp.A-B, sp.B-C, sp.D-E, ... are region in which the character can move. A, B, C, D, E, ... surrounded by a circle indicate a camera position.

Moving image data cam.A-B indicates camera work and movie when the camera moves from the camera position A to the camera position B. Moving image data cam.B-A indicates camera work and movie when the camera moves from the camera position B to the camera position A. According to this embodiment, image data of camera work for moving from the camera position A to the camera position B and image data of camera work for moving from the camera position B to the camera position A are possessed separately. The same thing can be said for the other cases.

Likewise, moving image data cam.B-C indicates camera work and movie when the camera moves from the camera position B to the camera position C. Moving image data cam.C-B indicates camera work and movie when the camera moves from the camera position C to the camera position B.

Likewise, moving image data cam.B-D indicates camera work and movie when the camera moves from the camera position B to the camera position D. Moving image data cam.D-B indicates camera work and movie when the camera moves from the camera position D to the camera position B.

Likewise, moving image data cam.D-E indicates camera work and movie when the camera moves from the camera position D to the camera position E. Moving image data cam.E-D indicates camera work and movie when the camera moves from the camera position E to the camera position D.

Assuming that the character 4 begins to move from the region sp.A, when it is determined that the character 4 is located within the region sp.A and the overlapping region sp.A-B, the image processing means 2 processes so as to display a frame (background image (image data cam.A)) taken by the camera 15A at the camera position A.

If the character 4 moves from the overlapping region sp.A-B to the region sp.B, the camera work and movie (moving image data cam.A-B) are reproduced and stopped at a final frame.

As understood from FIG. 11, the character can move in three directions from the region sp.B. Of course, the number of divisions is not limited to this, but may be divided to any number.

When the character 4 moves from the overlapping region sp.A-B to the region sp.A, if it exists at the overlapping region sp.A-B, a final frame of the moving image data cam.A-B is kept as it is and when the character 4 moves to the region sp.A, reproduction of the moving image data cam.B-A begins. Then, the camera 15 is moved to the camera position A, in which the screen cam.A (final frame of the moving image data cam.B-A) is displayed.

Further, if the character 4 moves from the region sp.B to the region sp.C, when it moves from the overlapping region sp.B-C to the region sp.C, reproduction of the image data begins. If the character 4 exists in the region sp.C or overlapping region sp.B-C, the final frame is displayed.

Further, if the character 4 moves from the region sp.B to the region sp.D, when it moves from the overlapping region sp.B-D to the region sp.D, reproduction of the image data begins. If the character data 4 exists in the region sp.D or the overlapping sp.D-E, the final data is displayed.

Meantime, the width of such a neutral zone as the overlapping region sp.A-B can be set up arbitrarily and of course, the width thereof may be 0.

In FIG. 14, it is assumed that the image processing means 2 generates the background image data 3d by combining an aisle 30j with a staircase 30k, each having a predetermined length and composed of computer graphics and this background image data 3d is created as background image data viewed from directions of arrows X, Y. Further, this background image data 3d is created by viewing from the directions of the arrows X, Y. That is, the angle of the camera 16 which photographed the background screen data is made to substantially coincide with the angle of the virtual camera 15 which will photograph the character 4.

The substantial coincidence between both the cameras 15, 16 refers to such an extent that there is no feeling of unnaturalness in view on the screen. The angle of the camera 16 relative to this movie and a range of the angle of the virtual camera 15 are determined appropriately.

It is assumed that the virtual camera 15 photographs a state in which the character data 4d is moving under such background image data 3d. First, it is assumed that the virtual camera 15A is photographing the background image data 3d and the character data 4d from a point A surrounded by circle. With moving of the character data 4d, an image which moves to image 60b, 60c, 60d in order is displayed on the display 6.

Then, if the character data moves from the overlapping region sp.A-B to the region sp.B, the camera moves from the camera 15A located at the camera position A to the camera 15B at the camera position B. The camera work and its movie when the camera 15 moves from the camera position A to the camera position B can be outputted. A processing of a case where the character moves like this will be described with reference to FIGS. 11 to 14.

When the character is moving in the region sp.A, the operations of steps S21 to S24 of FIG. 12 are repeated. The processings of steps S21 to S24 are similar to the operations described in the first embodiment.

When the character is moving, the image processing means 2 obtains background image data 3j (cam.A) photographed by the camera 15A from the camera position A indicated in FIG. 11 as background image data 3d.

An outline of the operations achieved by processings of steps S21 to S24 are as follows like the first embodiment.

First, frame data FD1a of a corresponding scene is read and simple model data 5d of the corresponding scene is read and then the aforementioned simple model data 5d is disposed in virtual space. Then, a collision between the game character data 4d and the simple model 5d is checked to determine whether or not it is necessary to hide the character in a movie image. A processing corresponding to a result of the determination is carried out (S21: FIG. 13).

That is, as indicated by the sub-routine of FIG. 13, the frame data FD1a and the simple model data 5d of the corresponding scene are read and the simple model data 5d is disposed in the virtual space (step S201). After that, a collision between the game character data 4d and the simple model data 5d is checked so as to determined whether or not it is necessary to hide the character in the movie image (S202).

If it is not necessary to hide the character (S202: NO), this processing is passed without doing anything. If it is necessary to hide it (S202: YES), the simple model data is disposed corresponding to an angle of the camera 15A (S203). The movie image is represented at a portion in which the simple model data 5d overlaps the character data 4d.

Next, the image processing means 2 moves the character data in the movie screen data according to peripheral data obtained when a player operates the PAD 7b (S22).

If this step S21 is finished, the aforementioned sub-routine (steps S201 to S203 of FIG. 13) is carried out again (S22).

Then, the image processing means 2 determines whether or not the position of the camera 15 for the background image data composed of the movie screen data has to be changed (S24). If the character data 4d exists in the region sp.A and the overlapping region sp.A–B, it is determined that the position of the camera 15 has not to be changed (S24; NO) and the processing is returned to processings after step S22.

If the character moves from the overlapping region sp.A–B to the region sp.B (see FIG. 11), the image processing means 2 determines that the position of the camera 15 has to be changed (S24: YES). Then, as shown in FIGS. 11 and 14, the camera 15A at the camera position A is moved to the camera position B so as to obtain the camera 15B (S25). With this move of the camera, moving image data cam.A–B is reproduced (S25). At this time, overlapping image processing (steps S201, S202 of the sub-routine of FIG. 13) is carried out between the character data 4d and the background image data 3d (S26). Then, the image processing means 2 displays the frames photographed by the camera 15A from the camera position A to the camera position B and the movie synchronously therewith. After the final frame is displayed, the processing is finished (S27).

As a result, in this video signal, the character data 4d is disposed on the background image data of the staircase 3k composed of the movie screen and this video signal is supplied to the display, so that an image shown in FIG. 14(c) is displayed.

According to the second embodiment, the background represented by movie moves in linkage with a motion of the character composed of polygon, so that the screen can be displayed in a very beautiful state and further representation of images having a higher freedom can be executed.

It is preferable to provide a medium which stores a program for making the computer carry out operations of the respective embodiments. This medium includes, for example, floppy disc, hard disc, magnetic tape, CD-ROM, CD-R, DVD, ROM cartridge, battery back-up RAM memory cartridge, flash memory, involatile RAM card and the like.

Further, the medium mentioned here also includes wire-link communication medium such as telephone line, wireless communication medium such as micro wave and other communication medium. Internet is also included in this communication medium. Any medium whose program can be down loaded to the computer to achieve a predetermined function is also included in this medium.

Third Embodiment

The third embodiment of the present invention will be described with reference to FIGS. 15 to 20.

A game apparatus according to the third embodiment is intended to execute so-called musical game, in which a character as an object displayed on the screen dances with a music to achieve a game. This dance is divided to an operation for automatically actuating the character by means of the apparatus itself (hereinafter referred to automatic motion) and an operation for operating a control unit by a player in response to an instruction corresponding to a message reproduced during music (hereinafter referred to as manual motion).

For example, with dance music played as BGM, the character carries out basic motions such as walking, jumping and swinging legs to the right and left by the automatic motion. If an instruction, for example, like "UP, UP, RIGHT" is generated during music in parallel to that character's motion, the player operates a direction key corresponding to this command so as to try to play back manual motions corresponding to the command. At this time, if he presses a up key of the direction key twice and a right key once, for example, in a short period, an appropriate motion can be provided to the character. If this operation is not carried out appropriately, the character does not move appropriately. Further, other instructions, for example, "shoot" instruction for shooting an enemy character with a gun during this dance music may be included in the music. At this time, the player needs to operate a predetermined button. These operations compose game factors and an accuracy or speed of the operation are discriminated as a result of the game.

In both the automatic motion data and manual motion data, motion startup timing and time for reproducing the motion following sound data sequence are programmed beforehand. As described later, the sequence mentioned here corresponds to the characteristic of beat of sound data and includes a number of beats reproduced per minute. An outline of this control is in how many beats a specific motion corresponding to a specific motion data is reproduced from what beat.

The aforementioned instruction exists at a specific beat of music data and if the instruction is started, the character begins to execute its initial motion. For example, if an appropriate key operation is carried out during several frames, an appropriate motion is reproduced based on a corresponding motion data. However, if no appropriate key operation is carried out, an inappropriate motion is reproduced based on motion data corresponding to that key operation. These manual motions are controlled by sound data sequence as described before. A concrete content of the sequence will be described later.

Figure 15:
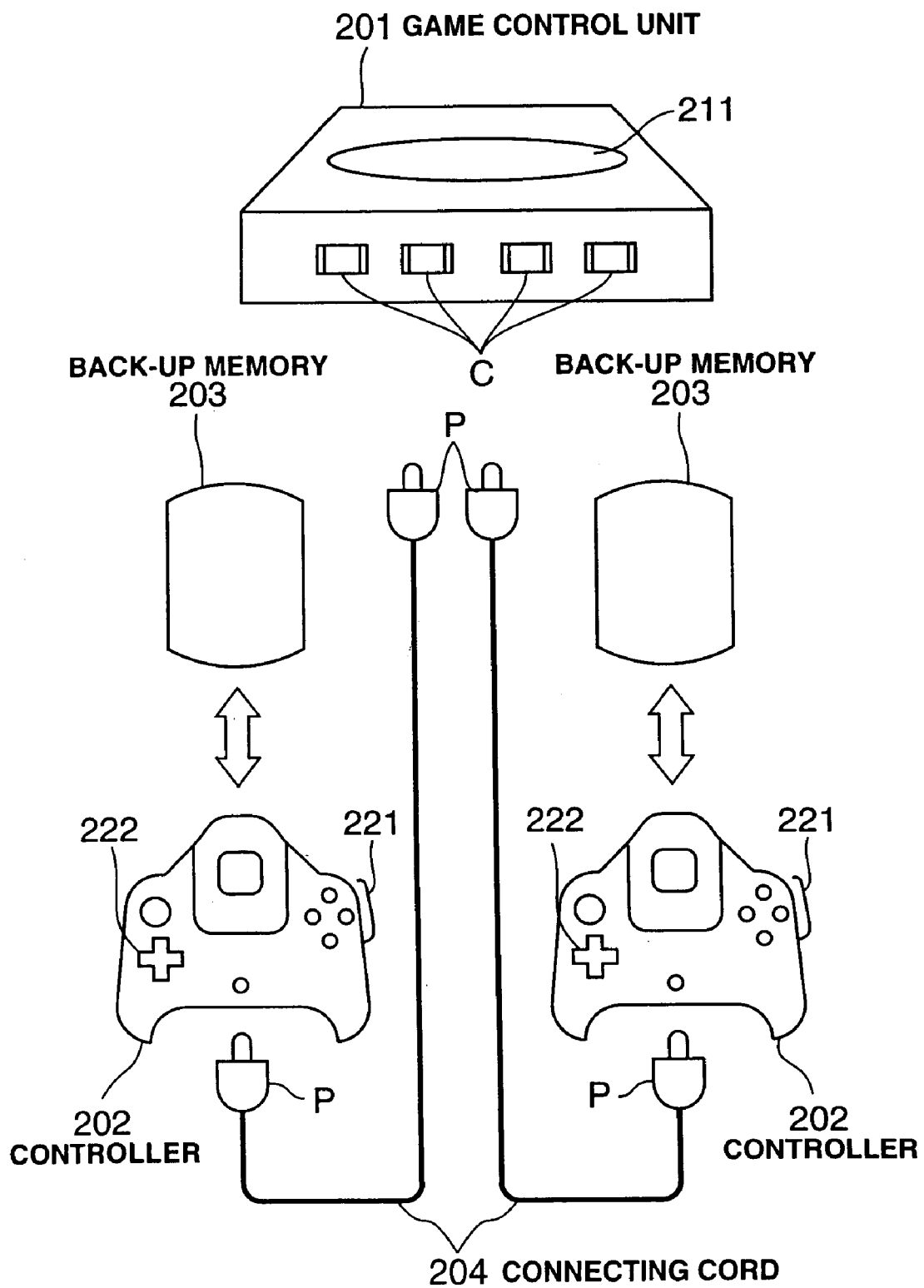
FIG. 15 is an outline diagram of a game apparatus according to a third embodiment of the present invention.
Figure 16:
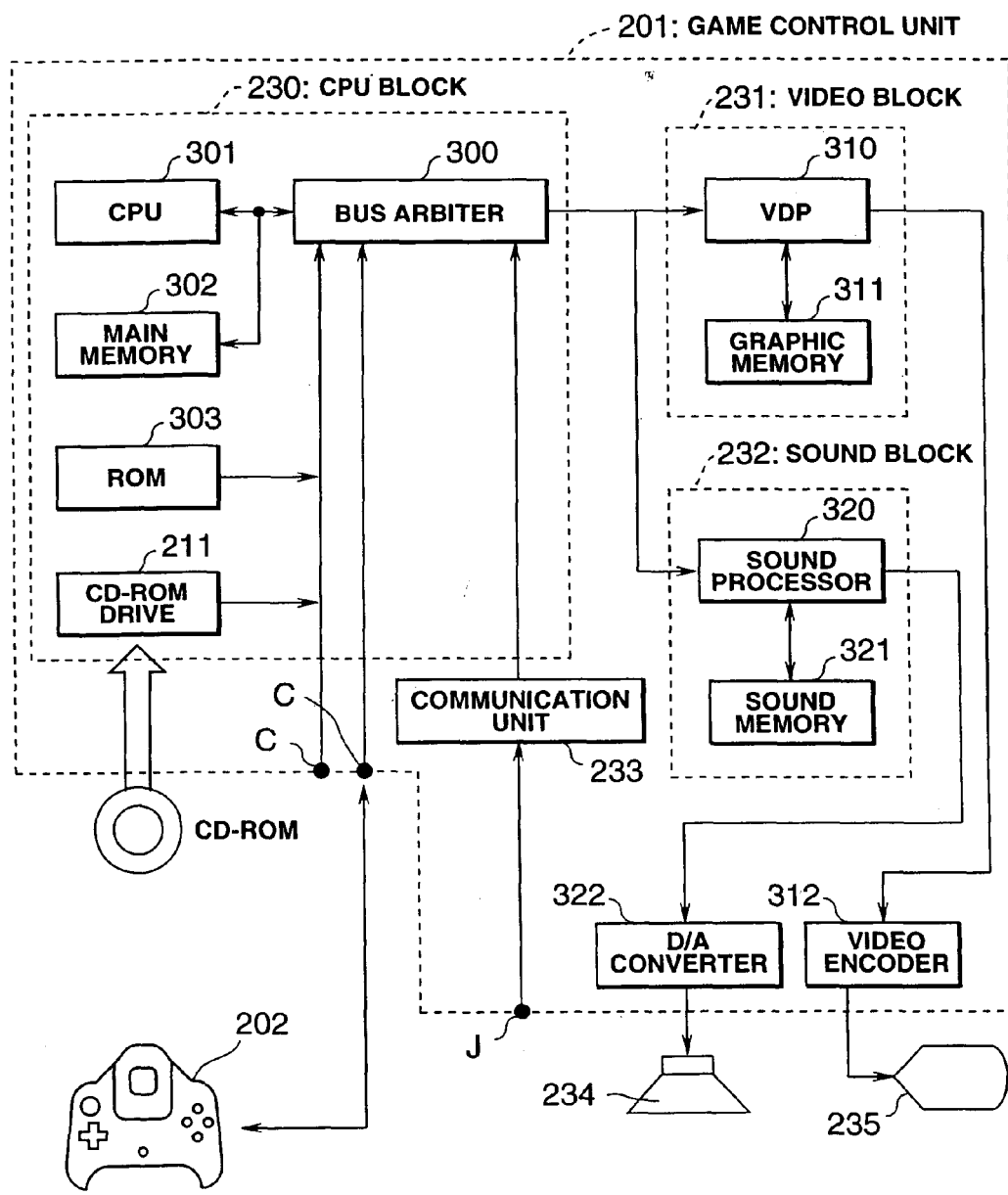
FIG. 16 is a block diagram showing an electrical structure of the game apparatus.

Hereinafter, the control on the automatic motion in this music game will be described. The automatic motion can be made to match with music (synchronous with or link with), be controllable easily, controlled with a smaller operation amount and coincide with various motions long or short in time easily. The same thing can be done for the manual motion. The game apparatus is constructed as follows. FIG. 15 shows a general diagram of the game apparatus of the present invention and FIG. 16 is an electrical hardware block diagram thereof. Reproduction of voice can be synchronized with motion of the character and further, reproduction of movie image of the background image can be also synchronized with a motion of the character. Consequently, reproduction of the movie image, motion of the character and reproduction of voice can be synchronized with each other.

A game control unit 201 controls a progress of the game. A plurality of controllers 202 can be connected to the game control unit 201 through connector C. The game control unit 201 contains a CD-ROM drive 211, on which a recording medium such as a CD-ROM can be loaded freely.

The controller 202 has a control portion which each player can operate and includes control buttons 221, cross key 222, and the like. The controller 202 can be connected to the game control unit 201 through a connection cord 204. The controller 202 contains a removable backup memory 203.

The game control unit 201 has a configuration similar to the computer unit. As shown in FIG. 16, it includes CPU block 230, video block 231, sound block 232 and communication unit 233.

The CPU block 230 comprises bus arbiter 300, CPU 301, main memory 302, ROM 303 and CD-ROM drive 211. The bus arbiter is so constructed to be capable of controlling transmission and reception of data by allocating bus occupation time to devices connected to each other through bus. The CPU 301 is so constructed to be capable of accessing the back-up memory 203 through the main memory 302, ROM 303, CD-ROM drive 211, video block 231, sound block 232, and controller 202.

The CPU 301 carries out various processings and controls necessary for executing a game and transmits image data to a graphic memory 311. Further, sound data can be transmitted to the sound memory 321. The ROM 303 is a storage region for an initial program loader. The ROM 303 is a factor for forming the recording medium of the present invention and stores programs necessary for processing of the CPU 301. Meanwhile, other CD-ROM may be used as this recording medium.

Although the CD-ROM drive 211 uses the CD-ROM as a recording medium for data supplied from outside, the recording medium for use is not restricted to this, however may be so constructed to be capable of reading other recording medium. Further, the CD-ROM drive 211 may be so constructed to transmit programs to the memory through the communication unit 233. This setting enables data to be transmitted from a fixed disc of a remote server.

The video block 231 comprises VDP (video display processor) 310, graphic memory 311 and video encoder 312.

With the above described structure, the video block 31 is so constructed to be capable of generating 3D image data and movie image. The video encoder 312 converts image data generated by the VDP 310 to predetermined television signals such as NTSC system signal and outputs to the main monitor 235 (CRT or the like of TV set).

The sound block 232 comprises a sound processor 320, sound memory 321 and D/A converter 322. With this structure, the sound block 232 performs sound synthesis based on waveform data and outputs an acoustic signal. The D/A converter 322 converts sound data generated by the sound processor 320 to analog signal and outputs to a speaker 234 connected to outside (speaker of TV set or speaker of acoustic unit).

The communication unit 233 is, for example, a modem or terminal adapter, which is connected to the game apparatus 201, and acts as an adapter for connecting the game control unit 201 to outside telephone line. The communication unit 233 receives data transmitted from a game supply server such as an Internet server connected to public telephone line and supplies the data to bus of the CPU block 230. The public telephone line network may be subscriber line, private line, wire-link line or wireless line.

Next, data group handled by this game apparatus will be described. This data group includes ADX data, game progress data, camera data, motion data group, motion progress data, movie data, character data operated depending on operation information and the like.

The ADX data is supplied as ADX compressed sound data. The sound data includes musical instrument digital interface (MIDI) data, PCM, CDDA, adaptive differential pulse code modulation (ADPCM) and the like. Although this ADX data is used as master data for time control, the time control master is not restricted to the ADX data. When the ADX data is not used, the movie data may be master data or MIDI sequence may be used at that time.

The ADX library is a library for reproducing the ADX compressed sound data. By using a function of this library, the ADX compressed sound can be reproduced easily. A sample number on current reproduction can be obtained according to a reproduction position function. A current frame number can be obtained from this sample number. Current frame data is obtained from the camera data on the main memory so as to set up a virtual camera. Likewise, game data of the current frame is obtained and data processing is executed.

The game progress data is composed of n beats of a music and frame number/beats (fpb). Therefore, it comes that fpb×nbeat=total frame number. Although a beat is set up to a length of 15 frames, it varies depending on BPM (beats/minute) of the music. Timing for processing each motion data is set up corresponding to one or multiple beats. Thus, if the BPM value is high, a motion of quick tempo can be represented even if the same motion is applied, and if the BPM value is low, the same motion can be represented slowly. As the camera data, viewpoint data (position, direction and rotation angle) of the virtual camera for total frame number are prepared preliminarily.

The motion data group is composed of multiple motion data about character motion. The multiple motion is divided to motion 1, motion 2, motion 3, . . . motion (m−1). Respective motions are allocated to each operation, for example, advancing the right foot by one, advancing the left foot by one, jumping up or the like. Each motion is represented by multiple image frames composed of frame number corresponding to one or n beats (n: integer).

Figure 17:
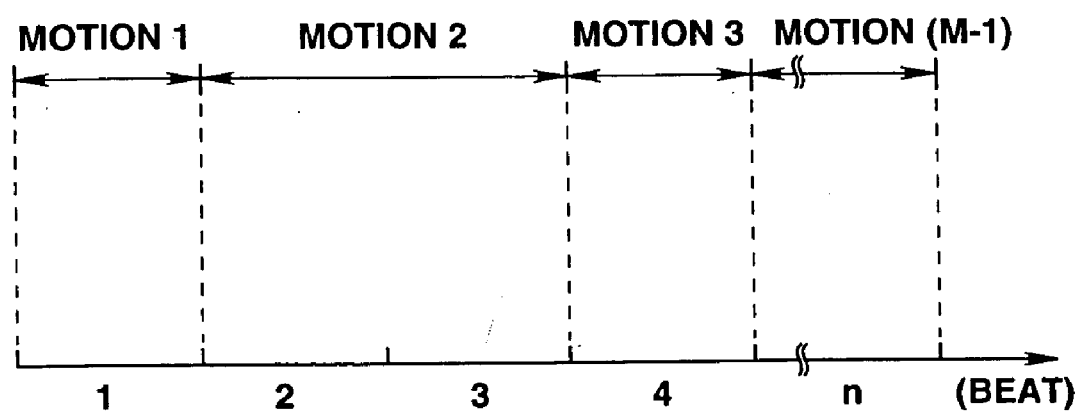
FIG. 17 is a diagram for explaining motion progress data.

As shown in FIG. 17, the motion progress data indicates sequence information indicating at which motion should be reproduced at which timing in the form of a beat string (time series).

The aforementioned camera data and movie data have one-to-one correspondence in the same frame. The movie data and ADX data are stored in the CD-ROM and the camera data, motion data group, motion progress data are called from the ROM and placed on the main memory.

Next, a processing of FIG. 18 to be carried out by the CPU 301 will be described.

In step S101, the CPU 301 determines whether or not a current period is a predetermined data processing period and if YES is determined, the processing proceeds to steps 102 and after.

That is, the CPU 301 reads operation information of the player outputted from the controller 2 as the control unit (step S102).

Next, the CPU 301 instructs reproduction of sound data as the ADX data (step S103). The ADX reproduction library is called corresponding to this instruction, the ADX data is transmitted from the CD-ROM to the main memory 302 and decoded to sound data. The decoded sound data is transmitted to the sound memory 321, processed by the sound processor 320 and reproduced from the speaker 234 as sound.

Next, the CPU 301 obtains the ADX data reproduction information (step S104). This information includes reproduction sample number (ncount) of the ADX data and sampling frequency (freq) and is obtained from the ADX reproduction library.

Next, "frame number/beat" (=fpb) is read from the game progress data and the current frame number (frame) and beats are calculated as a game reproduction position (step S105). The current frame number (that is, frame position) is computed according to an operational expression:

frame=$ncount \times FPS$/freq.

The current beat number is computed according to an operational expression:

beat=frame/$fpb$.

where FPS is a fixed value (frame/sec) in an application.

Next, corresponding to the frame number, the position of the virtual camera (virtual viewpoint) in the three-dimensional virtual space, direction, rotation angle and preliminarily stored camera data are read out (step S106).

Further, motion data corresponding to beats computed in step S104 is determined with reference to the motion progress data stored preliminarily by the CPU 301. This determined motion data is read out from the motion data group (step S107). Meanwhile, this motion data is set up by adding a motion caused when the player instructs the manual motion.

Figure 19:
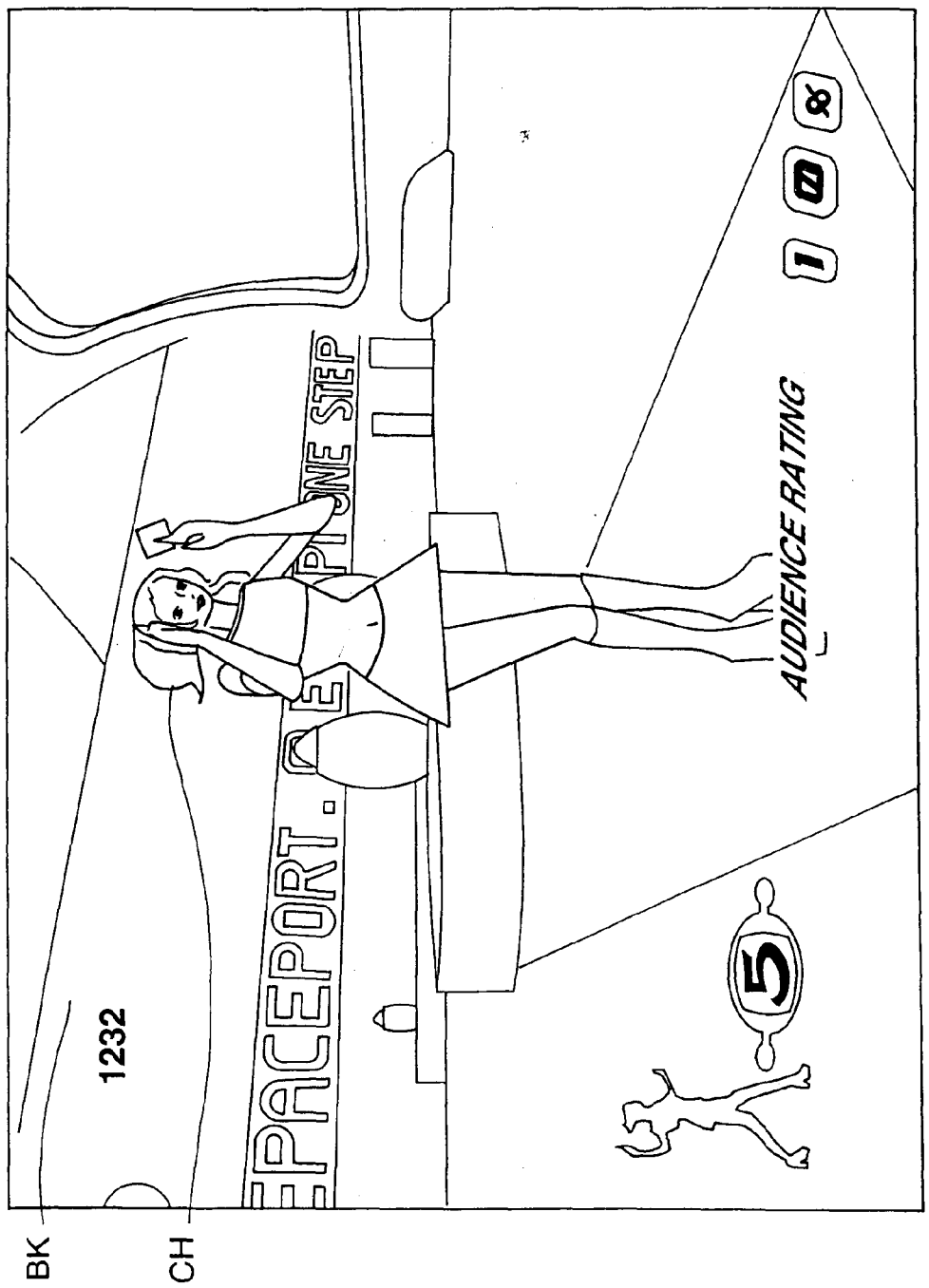
FIG. 19 is a diagram showing an example of an image to be displayed.
Figure 20:
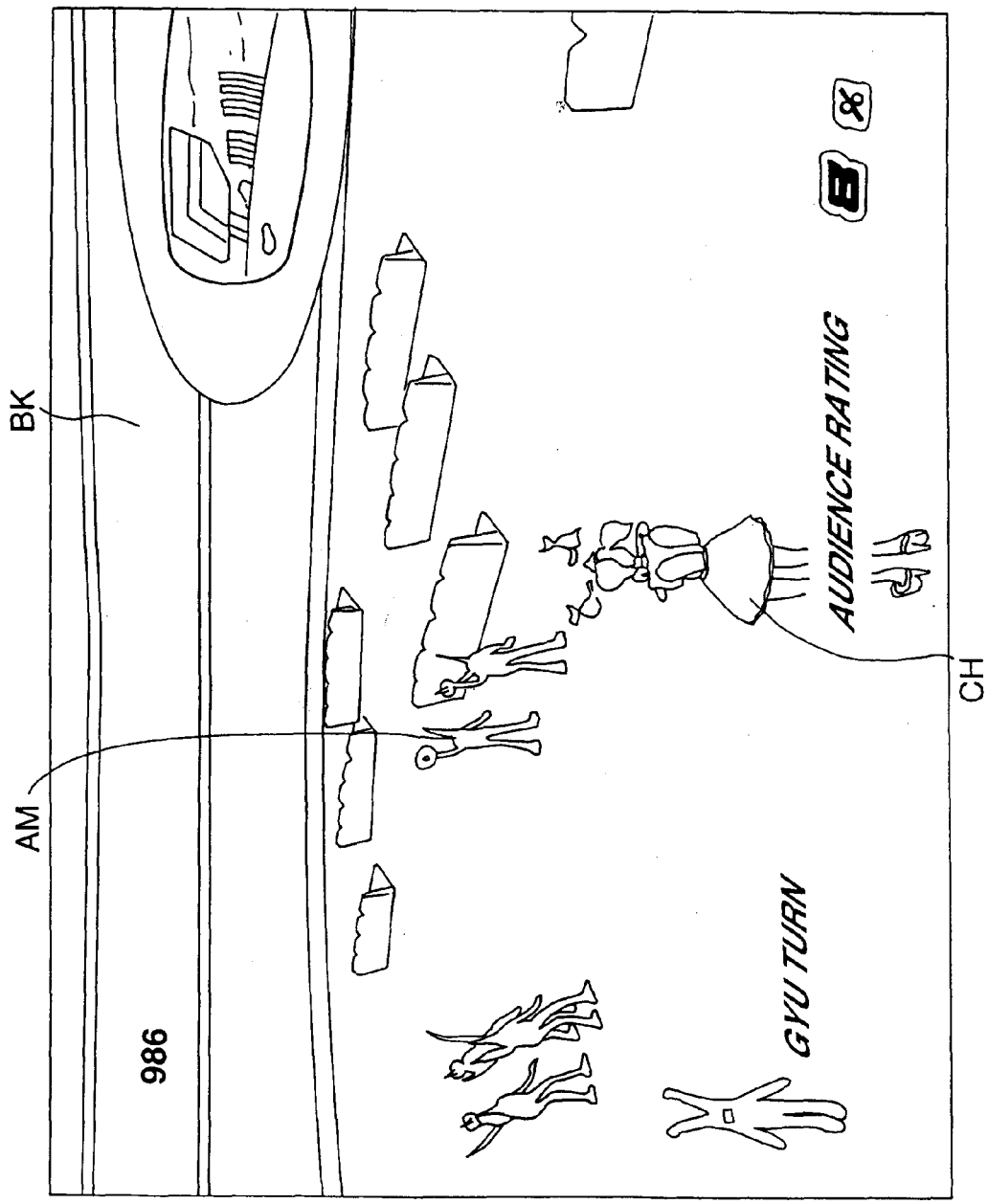
FIG. 20 is a diagram showing another example of the image to be displayed.

Next, game processing is carried out (step S108). This game processing includes projection conversion processing in which the character composed of polygon data is projected to a two-dimensional displayed image from a camera in the three-dimensional virtual space, selection processing for a movie image (two-dimensional background image) which coincides with a position, direction and rotation angle of the virtual camera, and determination of a game result depending on an operation condition corresponding to a manual motion instruction included in sound. The projection conversion processing is carried out by matching a position and direction of a light source upon projection conversion with those upon creation of movie image. The character image data and movie image created in the above manner are transmitted to the video block 31, so that the character image is overlaid on the movie image. Consequently, for example, images shown in FIGS. 19, 20 are displayed (step S109).

The movie image is two-dimensional image based on computer graphics as described in the previous embodiments. The movie image looks natural if it changes depending on a position, angle and rotation angle of the camera (viewpoint) for observing this image and therefore, the position, angle and rotation angle are preliminarily created depending on diversified kinds of the values.

By selecting a movie image which coincides with the virtual camera position so that the background does not look unnatural, a natural image having a reality can be displayed.

That is, when the aforementioned automatic motion is reproduced on the game screen, it is so programmed that positions of the virtual camera and light source with respect to the character composed of 3D data are set up to coincide with the positions of the camera and light source when the movie is created. Because a player's operation to the control portion is neglected when the automatic motion is reproduced, it is necessary only to make the positions of the camera viewpoint an light source when the movie is created coincide with the positions of the virtual camera and virtual light source with respect to the character.

In case of the manual motion, because the position of the virtual camera with respect to the 3D character needs to be diversified, a large number of movie images from a camera (viewpoint) corresponding to each position of the virtual camera which can be disposed in the three-dimensional virtual space are prepared preliminarily. Then, a movie image corresponding to a position of the virtual camera operated with respect to the 3D character is selected and drawn as the background image.

Assume that the player changes a state in which he instructs a viewpoint to see the character from its front to a camera viewpoint in which the character is seen from its side. That is, if the state in which the virtual camera is located in front of the character is changed to the state in which the same camera is located on its side, the movie image (background image) displayed on the monitor 235 is changed with the character image. That is, the movie image is changed corresponding to the camera position as described above so that an image of reality is produced. Because the position of the virtual camera is changed corresponding to a key operation when the manual motion is reproduced, the movie images from diversified viewpoints corresponding to a different position of the virtual camera are prepared preliminarily.

In the aforementioned projection conversion processing when the manual motion is reproduced, the position and direction of the light source for use in the three dimensional virtual space are made to coincide or substantially coincide with those when the movie image is created. Consequently, the shadow and shade look natural on the monitor screen when an image is projected.

By using the movie image as the background at the same time, an operation amount can be reduced largely while maintaining an image quality as compared to a case where the entire screen is represented with polygon.

FIG. 19 indicates a scene of an image in which the character CH dances on floor corresponding to music (BGM) obtained by decoding the ADX data. The character CH is composed of polygon and displayed on the background which is a movie image BK. This character CH carries out automatic motion such as walk, jump or the like necessary for dance. Because such instructions as "UP" and "DOWN" are included in the music halfway, the player only have to operate the controller 202 corresponding to that instructions. If the player can operate the controller 202 with a good timing with the music, he can make the character CH dance with a good balance.

Further, if an enemy character AM appears halfway of the game as shown in FIG. 20, this enemy character also dances together in a predetermined period. Then, if a predetermined instruction, for example, "SHOOT" is dispatched from the music, the player presses a predetermined button on the controller 202. As a result, the character CH shoots to the enemy character AM with a gun.

Such a player's controller operating condition, for example, timing or accuracy of the operation, is reflected on the game result, so that the player enjoys the music game.

Motions of the characters CH and AM are displayed in linkage with music at this time. Because this representation uses the game progress data and motion progress data determined preliminarily, as compared to a case in which the linkage of the motion with music is controlled at real time, the processing is simple and the operation amount is smaller. Particularly because motions are allocated to the length of music or each of the beats covering the entire game time by the motion progress data, there is an advantage that the freedom in time progress on the master for time control is high. That is, the game speed can be changed in various styles so that convenience is increased. If the frame speed (frame/second) is different (for example, PAL or the like), it is possible to cope with slow motion, rapid motion and the like easily without changing the program largely.

Further, according to this embodiment, even if the camera viewpoint is changed, the image is displayed in a state in which the direction of the viewpoint substantially coincides with the direction of the background. Therefore, a natural image without a sense of disharmony in terms of directivity can be provided while keeping the operation amount low. Additionally, because the light source position upon projection conversion to a character indicated with polygon substantially coincides with the light source position to the movie image, a natural image without a sense of disharmony can be provided about the shadow and shade.

In FIG. 20, "Gyu turn" indicated on the left bottom thereof indicates a symbol of the character. This indication means that the player is urged to operate the character. When this symbol is changed from a symbol of the enemy character AM to that of the character CH, the player can recognize that he needs to input this time. In case that the enemy character is indicated, image processing for an attack from the enemy character to the player is carried out by means of computer.

The present invention is not restricted to the above described embodiments and may be modified in any appropriate embodiment within a scope not departing from a spirit thereof.

As described above, according to an aspect of the present invention, the image processing apparatus of the present invention comprises a first display object including a movie image and a second display object composed of solid image of polygon data and further, a simple model composed of three dimensional data for determining the precedence in erasing a negative face between the first display object and the second display object. Consequently, representation of the screen is diversified and a drawing processing load is reduced remarkably, and a motion of a display object moving on the movie screen can be represented more smoothly.

According to another aspect of the invention, the background represented by a movie moves in linkage with a motion of a character composed of polygon. Thus, a very beautiful representation can be achieved and the freedom of the representation is increased.

Further, according to still another aspect of the invention, by providing part of data group necessary for a game with game progress data or motion progress data, an image in which the motion of the object synchronizes with (is linked with) reproduction of music can be represented with less computation amount without carrying out any complicated control. Further, a game speed can be changed to various values so that a highly flexible image processing is enabled without changing a program.

FIG. 1
2 IMAGE PROCESSING UNIT
FIG. 2
10 CPU BLOCK
101 MAIN CPU
104 SUB CPU
7A CONNECTOR
11 VIDEO BLOCK
12 SOUND BLOCK
170 D/A CONVERTER
122 FRAME BUFFER
123 FRAME BUFFER
132 MEMORY
160 ENCODER
13 SUB-SYSTEM
FIG. 3
ENTIRE FLOW
S11 DATA PROCESSING PERIOD?
S12 GAME PROCESSING
S13 IMAGE PROCESSING
S14 DISPLAY
RETURN
FIG. 4
FLOW START
S131 READ DATA OF APPROPRIATE SCENE
S132 READ A MOVIE IMAGE OF APPROPRIATE SCENE
S133 READS POSITION DATA OF MASTER MODEL OF APPROPRIATE SCENE
S134 ALLOCATION OF MASK MODEL TO VIRTUAL SPACE
S135 DETERMINING COLLISION BETWEEN GAME CHARACTER AND MASK MODEL.
S136 CORRECT AND DISPLAY GAME CHARACTER
S137 VIEWPOINT CONVERSION
S138 OUTPUT TO FRAME BUFFER
FLOW END
FIG. 9
CD1 CAMERA DATA 1
6D1 SIMPLE MODEL DATA 1
MOVIE D1
START FRAME
TIME AXIS
FIG. 12
S22 MOVE CHARACTER
S24 IS CAMERA POSITION CHANGING CONDITION SATISFIED?
S25 CAMERA POSITION BEGINS TO MOVE (SYNCHRONOUS MOVIE IS REPRODUCED)
S26 EVERY ONE FRAME
S27 CAMERA POSITION MOVE ENDS (SYNCHRONOUS MOVIE ENDS)
FIG. 13
S201 DATA READ/DISPOSE
S202 IS THERE ANY OBJECT HIDING A CHARACTER IN MOVIE?

Figure 18:
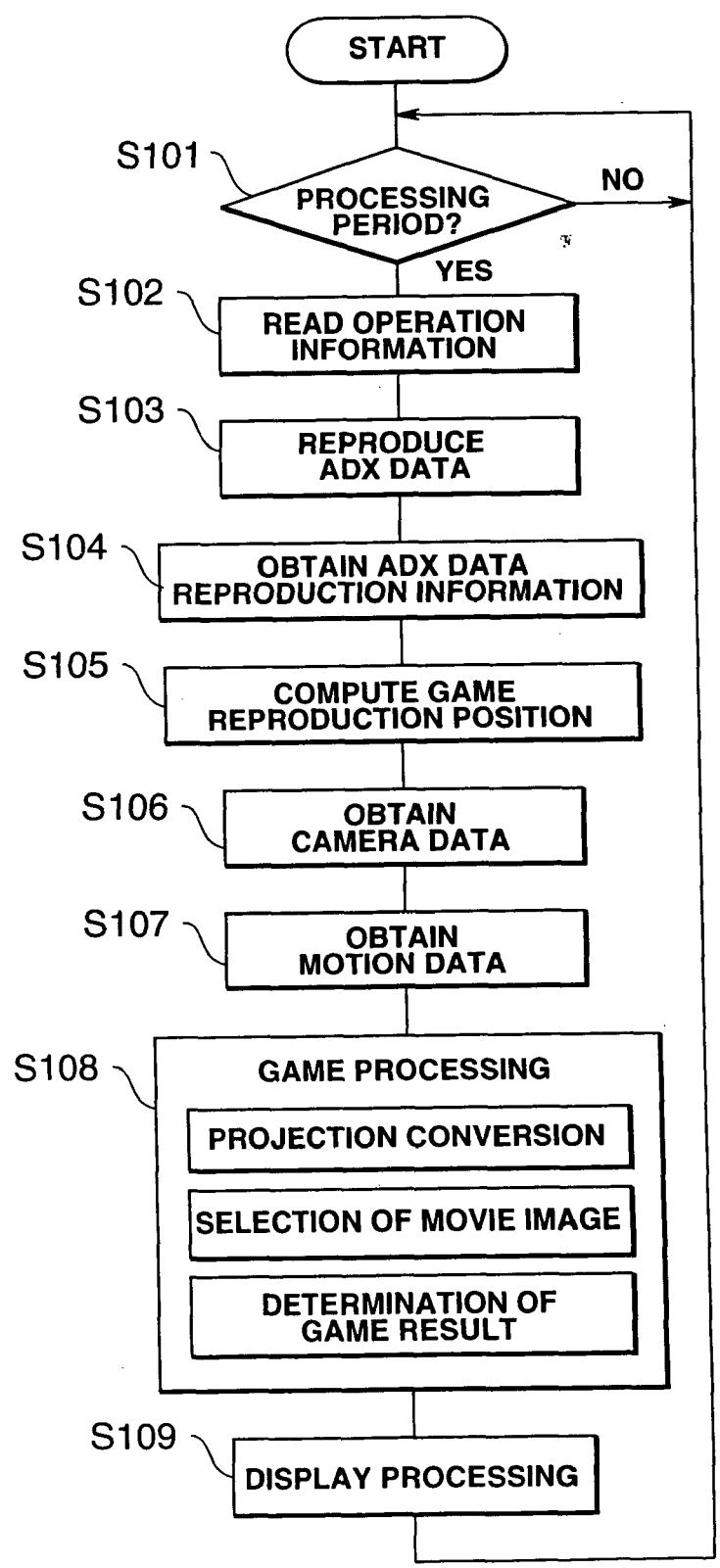
FIG. 18 is a flow chart for explaining an outline of processings related to a game executed by CPU according to the third embodiment.

S203 DISPOSE SIMPLE MODEL CORRESPONDING TO CAMERA RETURN
FIG. 15
201 GAME CONTROL UNIT
203 BACK-UP MEMORY
202 CONTROLLER
204 CONNECTING CORD
FIG. 16
201 GAME CONTROL UNIT
230 CPU BLOCK
300 BUS ARBITER
302 MAIN MEMORY
211 CD-ROM DRIVE
231 VIDEO BLOCK
311 GRAPHIC MEMORY
232 SOUND BLOCK
320 SOUND PROCESSOR
321 SOUND MEMORY
322 D/A CONVERTER
312 Video ENCODER
FIG. 17
MOTION 1 MOTION 2 MOTION 1 MOTION (M-1)
FIG. 18
START
S101 PROCESSING PERIOD?
S102 READ OPERATION INFORMATION
S103 REPRODUCE ADX DATA
S104 OBTAIN ADX DATA REPRODUCTION INFORMATION
S105 COMPUTE GAME REPRODUCTION POSITION
S106 OBTAIN CAMERA DATA
S107 OBTAIN MOTION DATA
S108 GAME PROCESSING
PROJECTION CONVERSION
SELECTION OF MOVIE IMAGE
DETERMINATION OF GAME RESULT
S109 DISPLAY PROCESSING
FIG. 19
AUDIENCE RATING
FIG. 20
GYU TURN
AUDIENCE RATING

What is claimed is:

1. An image processing apparatus wherein a first display object, including a movie image, and a second display object represented by polygon data, are displayed on a display means, said image processing apparatus comprising:
an image processing means for performing image processing by generating a simple model which extends to a contour of the first display object and is composed of three dimensional polygon data, having no texture, for determining a precedence in erasing a negative face between said first display object and said second display object, wherein said simple model is not displayed.

2. An image processing apparatus according to claim 1 wherein said first display object composes a background of a game screen while said second display object composes a character displayed on the background.

3. An image processing apparatus according to claim 1 wherein said simple model is three dimensional data composed of polygon data set up roughly.

4. An image processing apparatus, comprising:
at least one processor executing instructions for:
receiving a first display object including a movie image;
receiving a second display object represented by polygon data;
generating said second display object with respect to a first viewpoint and a first position of a virtual camera;
controlling a motion of said virtual camera so said first viewpoint and said first position of said virtual camera substantially coincides with a second viewpoint and a second position of a second camera, when said second display object moves over said first display object, wherein said second viewpoint and second position corresponds to said first display object; and
generating said first display object with an inverse motion when said second display object moves over said first display object in an inverse direction, while said first viewpoint and said first position of said virtual camera substantially coincides with said second viewpoint and said second position of said second camera, which corresponds to said first display object moving with said inverse motion.

5. An image processing apparatus according to claim 4 wherein when said second display object moves from one section to other section of multiple sections produced by dividing a region in which said second display object should move of said first display object, a position of the virtual camera substantially coincides with a camera angle in each of the sections.

6. An image processing method for displaying a first display object, including a moving image, and a second display object represented by polygon data on a display means, said image processing method comprising:
generating a simple model which extends to a contour of the first display object and is composed of three dimensional polygon data having no texture, wherein the simple model is not displayed;
placing the simple model in a portion of said first display object; and
determining a precedence in erasing the a negative face of said second display object using the simple model.

7. An image processing method, comprising:
receiving a first display object including a movie image;
receiving a second display object represented by polygon data;
generating said second display object with respect to a first viewpoint and a first position of a virtual camera;
controlling a motion of said virtual camera s o said first viewpoint and said first position of said virtual camera substantially coincide s with a second viewpoint and a second position of a second camera, when said second display object moves over said first display object, wherein said second viewpoint and second position corresponds to said first display object; and
generating said first display object with an inverse motion when said second display object moves over said first display object in an inverse direction, while said first viewpoint and said first position of said virtual camera substantially coincides with said second viewpoint and said second position of said second camera, which corresponds to said first display object moving with said inverse motion.

8. A recording medium including a program for making a computer act as an image processing means or image processing method according to any one of claim 1 to 8.

9. An image processing apparatus according to claim 4, wherein an image having a motion of the second display object existing in a virtual space is displayed on a screen of a display means in linkage with sound comprising:

display control means for displaying a dancing motion of said second display object corresponding with sound data, wherein a motion of said second display object can be substantially simultaneously further controlled by a player;

reproducing means for reproducing sound based on said sound data, wherein said display control means comprising:

first obtaining means for obtaining reproduction information of sound data by said reproducing means;

computing means for computing a reproduction position of a game with reference to the reproduction information of the sound data obtained by the first obtaining means;

second obtaining means for obtaining data of the virtual camera and motion of said second display object based on a computation result of the computing means and motion progress data; and generation means for generating image data for displaying motion of said second display object on a monitor screen.

10. An image processing apparatus according to claim 9 wherein said first obtaining means is a means for obtaining reproduction sample number (ncount) and sampling frequency (freq) of sound data by said reproducing means and said computing means is a means for computing current frame number (frame) and beats with reference to said reproduction sample number (ncount) and sampling frequency (freq).

11. An image processing apparatus according to claim 10 wherein said computing means is a means for computing current frame number (frame) and beats according to:

frame=*ncount\*FPS*/freq beat=frame/*fpb*

(where FPS is a frame number per second and fpb is a frame number per beat).

12. An image processing apparatus according to claim 9 wherein said motion progress data includes data for allocating motions corresponding to beats of said sound data in time series.

13. A recording medium for recording a program for causing a computer to execute the functions of each of said respective means for the image processing apparatus according to any one of claims 9 to 12.

14. An image processing apparatus wherein a first display object, including a movie image, and a second display object represented by a complete model composed of polygon data, are displayed on a display means, said image processing apparatus comprising:

an image processing means for generating a simple model which extends to a contour of the first display object and is composed of three dimensional polygon data, having no texture, for determining a precedence in erasing a negative face between said first display object and said second display object, wherein said simple model is not displayed;

placing the complete model and the simple model in a three-dimensional coordinate space;

performing precedence processing for erasing a negative face of the complete model using the simple model;

performing coordinate conversion by setting a virtual viewpoint in the three-dimensional coordinate space to correspond to a viewpoint associated with the movie image; and generating a composite image of the complete model and the movie image.

15. An image processing method for displaying a first display object, including a moving image, and a second display object represented by a complete model composed of polygon data on a display means, said image processing method comprising:

generating a simple model which extends to a contour of the first display object and is composed of three dimensional polygon data having no texture, wherein the simple model is not displayed;

placing the simple model in a portion of said first display object;

placing the complete model and the simple model in a three-dimensional coordinate space;

determining a precedence in erasing a negative face of said second display object using the simple model;

performing coordinate conversion by setting a virtual viewpoint in the three-dimensional coordinate space to correspond to a viewpoint associated with the movie image; and generating a composite image of the complete model and the movie image.

* * * * *